(12) United States Patent
Yamamoto

(10) Patent No.: US 11,989,377 B2
(45) Date of Patent: May 21, 2024

(54) PEN AND SENSOR CONTROLLER

(71) Applicant: Wacom Co., Ltd., Saitama (JP)

(72) Inventor: Sadao Yamamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/501,822

(22) Filed: Oct. 14, 2021

(65) Prior Publication Data

US 2022/0035483 A1 Feb. 3, 2022

Related U.S. Application Data

(63) Continuation of application No. PCT/JP2019/023168, filed on Jun. 11, 2019.

(51) Int. Cl.
*G06F 3/044* (2006.01)
*G06F 3/0354* (2013.01)
*G06F 3/038* (2013.01)
*G06F 3/041* (2006.01)
*H04L 1/00* (2006.01)

(52) U.S. Cl.
CPC ........ *G06F 3/0441* (2019.05); *G06F 3/03545* (2013.01); *G06F 3/038* (2013.01); *G06F 3/0416* (2013.01); *G06F 3/0442* (2019.05); *H04L 1/0061* (2013.01)

(58) Field of Classification Search
CPC ...... G06F 3/038; G06F 3/0416; G06F 3/0442; G06F 3/0441; H04L 1/0061
See application file for complete search history.

(56) References Cited

U.S. PATENT DOCUMENTS

| | | | | |
|---|---|---|---|---|
| 9,495,024 B2* | 11/2016 | Watanabe | ............... | G06F 3/041 |
| 10,055,036 B2* | 8/2018 | Koike | ................. | G06F 3/04162 |
| 10,061,408 B2* | 8/2018 | Hara | ..................... | G06F 3/0442 |
| 10,459,540 B2* | 10/2019 | Hara | ........................ | G06F 3/041 |
| 10,606,382 B2* | 3/2020 | Yamamoto | ............ | G06F 3/0412 |
| 10,861,323 B2* | 12/2020 | Yamamoto | ........... | H04B 1/7073 |

(Continued)

FOREIGN PATENT DOCUMENTS

| | | |
|---|---|---|
| JP | 2008269005 A | 11/2008 |
| JP | 2016540453 A | 12/2016 |
| WO | 2018/043203 A1 | 3/2018 |

OTHER PUBLICATIONS

International Search Report dated Jul. 30, 2019, for the corresponding International Patent Application No. PCT/JP2019/023168, 1 page.

(Continued)

*Primary Examiner* — Olga V Merkoulova
(74) *Attorney, Agent, or Firm* — Seed IP Law Group LLP

(57) ABSTRACT

A pen includes reception circuitry configured to receive an uplink signal generated according to a first protocol. The pen includes transmission circuitry configured to transmit a downlink signal on the basis of a reception timing of the uplink signal and a command included in the uplink signal. In a case where the reception circuitry, after receiving the uplink signal, in a period in which the next uplink signal is receivable, receives an uplink signal that is in a special state instead of receiving the next uplink signal normally, the transmission circuitry transmits, according to the first protocol, the downlink signal including either data according to the command or default data.

20 Claims, 11 Drawing Sheets

(56) References Cited

U.S. PATENT DOCUMENTS

| | | | |
|---|---|---|---|
| 11,137,842 B2* | 10/2021 | Yamamoto | G06F 3/03545 |
| 2015/0171956 A1 | 6/2015 | Wang et al. | |
| 2015/0256329 A1 | 9/2015 | Cheong et al. | |
| 2016/0299583 A1* | 10/2016 | Watanabe | G06F 3/0412 |
| 2017/0228049 A1* | 8/2017 | Yamamoto | G06F 3/0441 |
| 2017/0308186 A1* | 10/2017 | Yamamoto | G06F 3/038 |
| 2018/0113519 A1* | 4/2018 | Yamamoto | G06F 3/04162 |
| 2018/0120963 A1* | 5/2018 | Hara | G06F 3/041 |
| 2018/0343079 A1* | 11/2018 | Imanilov | G06F 3/03545 |
| 2018/0364824 A1* | 12/2018 | Hara | G06F 3/03545 |
| 2019/0346970 A1* | 11/2019 | Yamamoto | G06F 3/04162 |

OTHER PUBLICATIONS

Japanese Notice of Reasons for Refusal dated Mar. 26, 2024, for the corresponding Japanese Patent Application No. 2023-118927, 8 pages. (With English Translation).

* cited by examiner

USE OLD PROTOCOL FOR PAIRING

USE NEW PROTOCOL FOR PAIRING

USE OLD PROTOCOL FOR PAIRING

PEN AND SENSOR CONTROLLER

BACKGROUND

Technical Field

The present disclosure relates to a pen and a sensor controller.

Description of the Related Art

In recent years, there are a growing number of applications that allow for simultaneous operation of a plurality of electronic pens (to perform drawing) on an electronic device including a large-sized touch surface, such as an electronic blackboard.

An example of a sensor controller that supports such simultaneous drawing using two electronic pens is disclosed in PCT Patent Publication No. WO2018/043203. The sensor controller of the example can allocate different local identifications (IDs) to two detected electronic pens and can include the local IDs in command signals to individually control the electronic pens.

An example of a sensor controller that synchronizes with an electronic pen when the sensor controller detects a pulse sequence of a predetermined length transmitted by the electronic pen is disclosed in U.S. Published Application No. 2015/0256329.

The protocol of the signals transmitted and received in both directions between the electronic pen and the sensor controller may change in accordance with advancement of relevant technology. Consequently, there can be a situation in which some of two or more electronic pens simultaneously used on an electronic device correspond to a protocol that is new (hereinafter, referred to as a "new protocol"), while other electronic pens only correspond to a protocol that is old (hereinafter, referred to as an "old protocol"). Thus, an electronic pen corresponding to both the old and new protocols (hereinafter, referred to as a "new pen") and an electronic pen corresponding to only the old protocol (hereinafter, referred to as an "old pen") need to be both usable on one electronic device.

BRIEF SUMMARY

Therefore, an aspect of the present disclosure is directed to providing an electronic pen and a sensor controller that allow simultaneous use of both a new pen and an old pen on one electronic device.

An aspect of the present disclosure provides a pen including reception circuitry configured to receive an uplink signal generated according to a first protocol. The pen includes transmission circuitry configured to transmit a downlink signal on the basis of a reception timing of the uplink signal and a command included in the uplink signal. In a case where the reception circuitry, after receiving the uplink signal, in a period in which the next uplink signal is receivable, receives an uplink signal that is in a special state instead of receiving the next uplink signal normally, the transmission circuitry of the pen transmits, according to the first protocol, the downlink signal including either data according to the command or default data.

Another aspect of the present disclosure provides a pen including reception circuitry configured to receive both a first uplink signal generated according to a first protocol and a second uplink signal generated according to a second protocol different from the first protocol. The pen includes transmission circuitry. In a case where the reception circuitry, after receiving the second uplink signal and entering a second operation mode according to the second protocol, receives the first uplink signal, the pen transmits a second downlink signal according to the second protocol.

The present disclosure provides a sensor controller that includes reception circuitry configured to detect both a first downlink signal generated according to a first protocol and a second downlink signal generated according to a second protocol different from the first protocol. The sensor controller includes transmission circuitry. For the sensor controller, a first frame for transmitting a first uplink signal of the first protocol and a second frame for transmitting a second uplink signal of the second protocol are alternately set in a defined ratio, and the reception circuitry, in operation, detects both the first and second downlink signals in the second frame.

According to the present disclosure, both the new pen and the old pen can simultaneously be used with one electronic device.

DETAILED DESCRIPTION

An embodiment of the present disclosure will now be described in detail with reference to the attached drawings.

Figure 1:
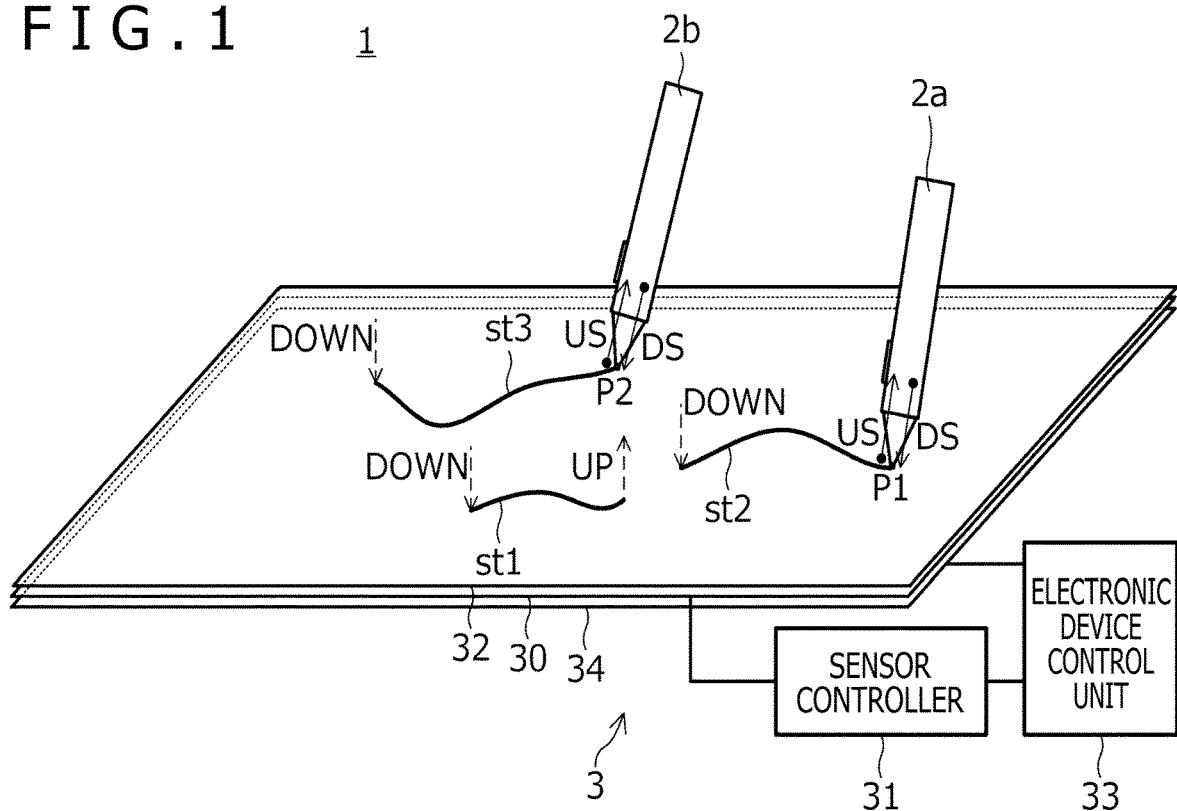
FIG. 1 depicts a position detection system according to an embodiment of the present disclosure.

FIG. 1 depicts an entire position detection system 1 according to the present embodiment. As illustrated in FIG. 1, the position detection system 1 includes two pens 2a and 2b and an electronic device 3. The electronic device 3 includes sensor electrodes 30, a sensor controller 31, a panel 32, an electronic device control unit 33, and a liquid crystal display unit 34.

The pens 2a and 2b are active styli corresponding to an active capacitance system, and the pens 2a and 2b may be simultaneously or separately used by one or more users. Hereinafter, the pens 2a and 2b will collectively be referred to as pens 2 in some cases when the pens 2a and 2b do not have to be particularly distinguished from each other.

The pen 2 and the sensor controller 31 can perform two-way communication. As also illustrated in FIG. 1, hereinafter, a signal transmitted from the sensor controller 31 to the pen 2 will be referred to as an uplink signal US, and a signal transmitted from the pen 2 to the sensor controller 31 will be referred to as a downlink signal DS.

The uplink signal US and the downlink signal DS are transmitted and received according to a predetermined protocol, and the protocol may change in some cases due to advancement in technology or the like. In the following description, a protocol newly launched at some point will be referred to as a new protocol (second protocol), and a protocol that has been used up to that point will be referred to as an old protocol (first protocol). The pen 2a is an electronic pen corresponding to only the old protocol (old pen), and the pen 2b is an electronic pen corresponding to both the old and new protocols (new pen), in the following description.

An outline of an input operation using the pen 2 will be described. The user gradually brings the pen 2 to a surface (touch surface) of the panel 32 (pen down; "DOWN" in FIG. 1) and eventually brings the pen tip of the pen 2 into contact with the touch surface (pen touch). When the user moves the pen tip on the touch surface in this contact state (pen move), the electronic device 3 executes a process of drawing a trajectory of the movement of the pen tip on the touch surface. FIG. 1 illustrates three trajectories st1 to st3 as examples of the trajectory drawn in this way. The trajectories are continuously drawn until the user separates the pen tip of the pen 2a from the touch surface (pen up; "UP" in FIG. 1).

The pen 2 is configured to detect the uplink signal US supplied by the sensor controller 31 through the sensor electrodes 30 and transmit a predetermined downlink signal DS corresponding to the uplink signal US. As described in detail later, the sensor controller 31 receives the downlink signal DS through the sensor electrodes 30 to acquire the position of the pen 2 in the touch surface and acquire the data transmitted by the pen 2. The position and the data acquired by the sensor controller 31 are sequentially supplied to the electronic device control unit 33. The electronic device control unit 33 generates stroke data on the basis of the position and the data supplied in this way. The electronic device control unit 33 renders the stroke data and outputs the stroke data to the liquid crystal display unit 34 to draw the trajectory on the touch surface.

Figure 2:
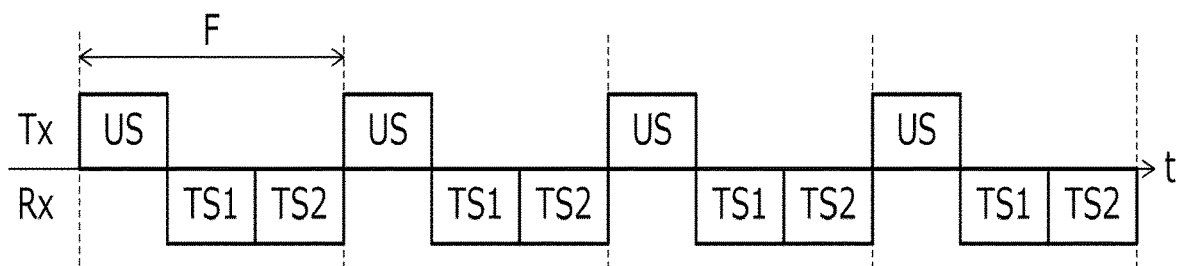
FIG. 2 depicts a schedule of transmission and reception in a sensor controller.

FIG. 2 depicts a schedule of transmission (Tx) and reception (Rx) in the sensor controller 31. As illustrated in FIG. 2, the sensor controller 31 is configured to transmit the uplink signals US and receive the downlink signals DS in frames F. The transmission of the uplink signal US and the reception of the downlink signal DS are executed in a time division manner in each frame F. Specifically, the sensor controller 31 first transmits the uplink signal US at the top of each frame F. The pen 2 then transmits the downlink signal DS in the remaining time of each frame F.

Figure 16:
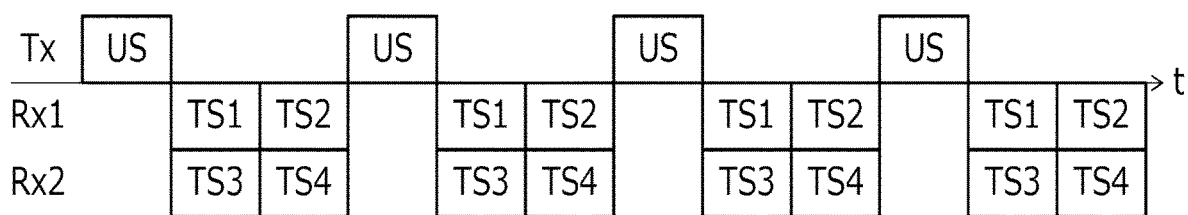
FIG. 16 depicts a schedule of transmission and reception in the sensor controller according to a second modification of the embodiment of the present disclosure.

As can be understood from FIG. 2, two reception time slots TS1 and TS2 are provided in one frame F in the present embodiment. Hereinafter, the time slots TS1 and TS2 will collectively be referred to as time slots TS in some cases when the time slots TS1 and TS2 do not have to be particularly distinguished from each other. The time slots TS are provided to allow different pens 2 to transmit the downlink signals DS in a time division manner, and two time slots TS1 and TS2 are provided in the present embodiment to allow two pens 2 at most to transmit the downlink signals DS in one frame F. This means that the number of pens 2 that can simultaneously be paired with the sensor controller 31 is two at most. However, as illustrated in FIG. 16 described later, the number of pens 2 that can simultaneously be paired with the sensor controller 31 is not limited to two. The time slot TS to be used by each pen 2 is determined when the sensor controller 31 and the pen 2 are paired.

Figure 3A:
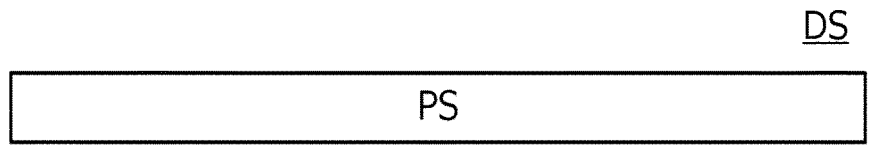
FIGS. 3A and 3B depict configurations of downlink signals.
Figure 3B:
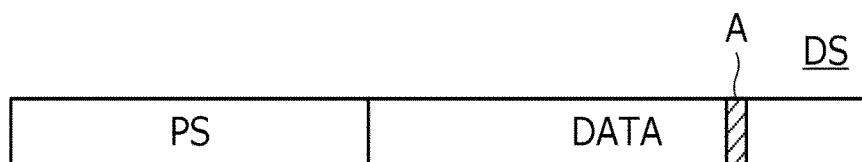

FIGS. 3A and 3B depict configurations of the downlink signals DS. FIG. 3A illustrates the downlink signal DS transmitted by the pen 2 that has not yet detected the sensor controller 31, and FIG. 3B illustrates the downlink signal DS transmitted by the pen 2 paired with the sensor controller 31.

As illustrated in FIG. 3A, the pen 2 that has not yet detected the sensor controller 31 transmits only a position signal PS as the downlink signal DS. The position signal PS is, for example, an unmodulated carrier signal. The position signal PS in this case is used by the sensor controller 31 to detect the position of the pen 2 in the entire touch surface. The position detection will be referred to as a "global scan" in the present disclosure. A specific method of the position detection in the global scan will be described later.

On the other hand, as illustrated in FIG. 3B, the pen 2 paired with the sensor controller 31 transmits, as the downlink signal DS, a data signal DATA in addition to the position signal PS. The position signal PS in this case is used by the sensor controller 31 to update the position of the pen 2. The update of the position will be referred to as a "local scan" in the present disclosure. A specific method of the update of the position in the local scan will also be described later.

The data signal DATA is a signal for transmitting data held in the pen 2 to the sensor controller 31. The data signal DATA includes a pen pressure value detected by a pen pressure detection unit 23 described later (see FIG. 5), a value indicating on/off of a switch arranged on a side surface or a bottom surface of a housing of the pen 2, a pen ID for uniquely identifying the individual pen 2, and the like. The pen 2 usually transmits the downlink signal DS including only the pen pressure value placed in the data signal DATA. On the other hand, when transmission of specific data is instructed by the sensor controller 31 through a command COMDATA, the pen 2 transmits the downlink signal DS including the data according to the command COMDATA.

Here, a bit A illustrated in FIG. 3B includes flag information, and a value included in the flag information when the pen 2 supports only the old protocol is different from a value included in the flag information when the pen 2 supports both the old protocol and the new protocol. The bit A is used to notify the sensor controller 31 of whether the pen 2 supports the new protocol. It is only necessary that the bit A be included in the downlink signal DS generated according to the old protocol, and the bit A does not have to be included in the downlink signal DS generated according to the new protocol.

Figure 4:
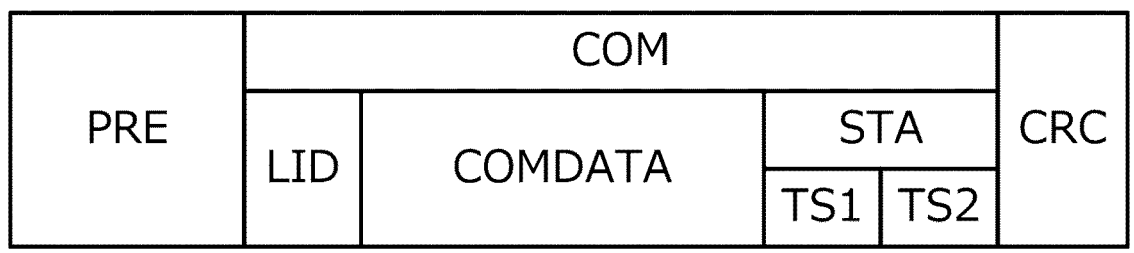
FIG. 4 depicts a configuration of an uplink signal.

FIG. 4 depicts a configuration of the uplink signal US. As illustrated in FIG. 4, the uplink signal US includes a preamble PRE, a command signal COM, and an error detection code CRC.

The preamble PRE is a synchronization signal for synchronizing the pen 2 with the sensor controller 31, and the preamble PRE is known to the pen 2. The synchronization signal includes, for example, a predetermined spread code (pulse sequence) including chips of the chip widths have predetermined lengths (for example, 0.5 us, 1.0 us, 2.0 us . . . ). The chip lengths of the spread code (code lengths of the spread code) are, for example, 7, 15, 31, 63 [chips] . . . . Two or more spread codes with such chip lengths may be connected to provide the synchronization signal. In another example, the synchronization signal may be, for example, a pulse sequence having a specific frequency including a predetermined number of continuous pulses, wherein the pulse widths have the lengths as in the example described above. The pen 2 continuously or intermittently performs a detection operation of the spread code included in the preamble PRE. When the pen 2 detects the preamble PRE, the pen 2 detects the existence of the sensor controller 31 and synchronizes with the sensor controller 31 based on the timing of the detection of the preamble PRE. The synchronization here denotes determining a transmission timing of the downlink signal DS and a reception timing of the next uplink signal US (that is, a transmission and reception schedule of the uplink signal US and the downlink signal DS) based on the timing of the detection of the preamble PRE. The pen 2 updates its synchronization every time the pen 2 receives the uplink signal US.

The command signal COM includes a local ID (LID) indicating the pen 2 that is the destination of the command signal COM; the command COMDATA including an instruction for the pen 2; and slot state information STA including bits indicating the availability of the time slots TS1 and TS2 illustrated in FIG. 2.

The error detection code CRC is a code obtained by performing a predetermined operation using the command signal COM as an input, and the error detection code CRC is used for detecting an error that may have occurred during the transmission of the command signal COM.

When the pen 2 that has not yet discovered the sensor controller 31 receives the uplink signal US, the pen 2 refers to the slot state information STA to check the availability of the time slots TS1 and TS2. As a result, if one of the time slots TS is available, the pen 2 uses the time slot TS to transmit the downlink signal DS including only the position signal PS. The sensor controller 31 that has received the downlink signal DS changes the slot state information STA of the time slot TS in which the downlink signal DS is received, to "in use" in the uplink signal US that is to be transmitted next. The pen 2 that has received the uplink signal US detects the change in the slot state information STA to detect that the sensor controller 31 has detected the pen 2. The pen 2 acquires a predetermined local ID corresponding to the time slot TS (for example, 0 for the time slot TS1 and 1 for the time slot TS2) in which the downlink signal DS is transmitted, and stores the local ID in a memory 45 of the pen 2.

When the pen 2 that has stored the local ID receives and decodes the uplink signal US later, the pen 2 first refers to the local ID in the command signal COM and then determines whether or not the local ID coincides with the local ID stored in the memory 45 of the pen 2 to thereby determine whether or not the uplink signal US is a signal transmitted to the pen 2. As a result of the determination, if the pen 2 determines that the uplink signal US is transmitted to the pen 2, the pen 2 extracts the command COMDATA from the command signal COM and executes a process corresponding to the content of the command COMDATA. The process includes a process of acquiring data requested, by the sensor controller 31, to be transmitted, and placing the data in a subsequent downlink signal DS. On the other hand, if the pen 2 determines that the uplink signal US is not transmitted to the pen 2, the pen 2 does not acquire the command COMDATA in the command signal COM and transmits a default downlink signal DS including the position signal PS and the data signal DATA with only the pen pressure value.

The sensor controller 31 is configured to use the sensor electrodes 30 to receive the position signal PS and thereby detect the existence and the position of the pen 2. Instruction positions P1 and P2 illustrated in FIG. 1 indicate examples of the position detected in this way. The trajectories st1 to st3 are trajectories of the movement of the instruction positions P1 and P2. The sensor controller 31 is also configured to use the sensor electrodes 30 to receive the data signal DATA and thereby acquire the data (such as a pen pressure value) transmitted by the pen 2.

Figure 5:
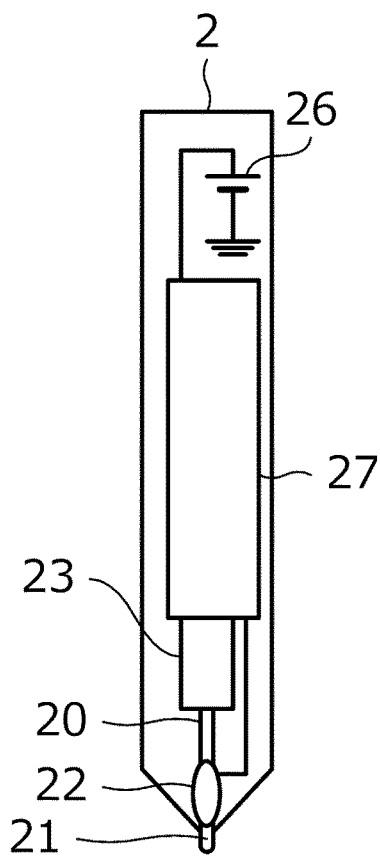
FIG. 5 depicts an internal configuration of a pen.

FIG. 5 depicts an internal configuration of the pen 2. As illustrated in FIG. 5, the pen 2 includes a core body 20, a pen tip electrode 22, the pen pressure detection unit 23, a power supply 26, and an integrated circuit 27 including reception circuitry for controlling reception of uplink signals and transmission circuitry for controlling transmission of downlink signals.

The core body 20 is a rod-shaped member arranged such that the longitudinal direction of the core body 20 coincides with the pen axis direction of the pen 2, and one end of the core body 20 includes a pen tip portion 21 of the pen 2. A conductive material is applied to the surface of the core body 20 to provide the pen tip electrode 22.

The pen tip electrode 22 is a conductor provided near or on the core body 20, and the pen tip electrode 22 is electrically connected to the integrated circuit 27 through a wire. The integrated circuit 27 receives the uplink signal US and transmits the downlink signal DS through the pen tip electrode 22. However, the pen tip electrode 22 may be separated into an electrode for transmission and an electrode for reception.

The pen pressure detection unit 23 is a functional unit that detects a force (pen pressure value) applied to the pen tip portion 21. Specifically, the pen pressure detection unit 23 is abutted to a back end portion of the core body 20, and through the abutment, the pen pressure detection unit 23 detects the force applied to the pen tip portion 21 when the user presses the pen tip of the pen 2 against the touch surface or the like. In a typical example, the pen pressure detection unit 23 includes a variable capacitance module in which the capacitance changes according to the force applied to the pen tip portion 21.

The power supply 26 is configured to supply operating power (direct current (DC) voltage) to the integrated circuit 27, and the power supply 26 includes, for example, a cylindrical AAAA battery.

The integrated circuit 27 is a processing unit including a circuit group formed on a substrate not illustrated. The integrated circuit 27 executes a process of receiving the uplink signal US through the pen tip electrode 22 (e.g., via the reception circuitry thereof) and a process of generating the downlink signal DS on the basis of the received uplink signal US and transmitting the downlink signal DS through the pen tip electrode 22 (e.g., via the transmission circuitry thereof). The type of protocol supported by the pen (only the old protocol or both the old and new protocols) is decided according to at least one of firmware and hardware of the integrated circuit 27.

As described in detail later with reference to FIG. 9, the integrated circuit 27 of the pen 2a that is the old pen supportive of only the old protocol is operated in one of the following modes: a discovery mode S0 for discovering the sensor controller 31; a communication mode S1 for communicating with the discovered sensor controller 31; and a continuation mode S1a for continuing the communication with the sensor controller 31 even when the uplink signal US in a special state described later is received after entering the communication mode S1. Hereinafter, the uplink signal US in the special state will be referred to as an "uplink signal SUS," and the uplink signal US normally (correctly) received according to the old protocol will be referred to as an "uplink signal NUS."

As described in detail later with reference to FIG. 10, the integrated circuit 27 of the pen 2b that is the new pen supportive of both the old and new protocols is operated in one of the following modes: a discovery mode S10 for discovering the sensor controller 31; an old mode S11 (first operation mode) for using the old protocol to communicate with the discovered sensor controller 31; an old continuation mode S11a for continuing the communication with the sensor controller 31 even when the uplink signal US generated according to the new protocol is received after entering the old mode S11; a new mode S12 (second operation mode) for using the new protocol to communicate with the discovered sensor controller 31; and a new continuation mode S12a for continuing the communication with the sensor controller 31 even when the uplink signal US generated according to the old protocol is received after entering the new mode S12. Hereinafter, the uplink signal US generated according to the old protocol will be referred to as an "uplink signal US1," and the uplink signal US generated according to the new protocol will be referred to as an "uplink signal US2." For the pen 2a, the uplink signal US1 is the uplink signal NUS, and the uplink signal US2 is the uplink signal SUS.

Figure 6:
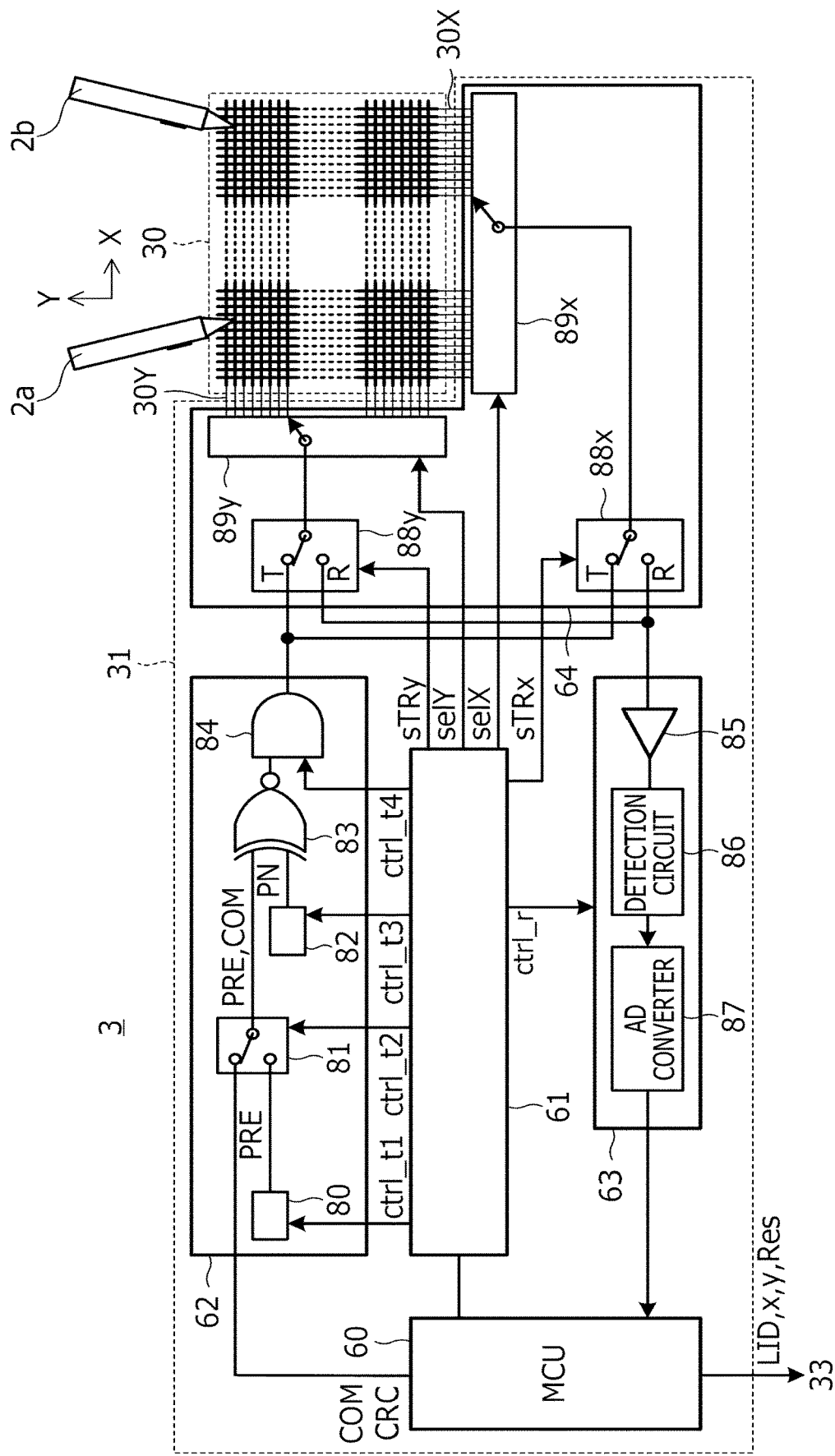
FIG. 6 depicts an internal configuration of an electronic device.

Next, FIG. 6 depicts an internal configuration of the electronic device 3. The configuration and the operation of the electronic device 3 will be described in detail below with reference to FIG. 6.

The sensor electrodes 30 include a plurality of linear electrodes 30X extending in a Y direction and a plurality of linear electrodes 30Y extending in an X direction. The sensor electrodes 30 are capacitively coupled to the pen 2 through the linear electrodes 30X and 30Y. The uplink signals US and the downlink signals DS are transmitted and received through the capacitive coupling.

The sensor controller 31 includes a micro controller unit (MCU) 60, a logic unit 61, a transmission unit (transmission circuitry) 62, a reception unit (reception circuitry) 63, and a selection unit 64 as illustrated in FIG. 6.

The MCU 60 and the logic unit 61 are control units that control the transmission unit 62, the reception unit 63, and the selection unit 64 to control the transmission and reception operation of the sensor controller 31. More specifically, the MCU 60 is a microprocessor including a read only memory (ROM) and a random access memory (RAM) inside and is operated based on a predetermined program. The process executed by the MCU 60 includes a process of controlling the logic unit 61, a process of generating the command signal COM and the error detection code CRC according to the control of the electronic device control unit 33 and supplying the command signal COM and the error detection code CRC to the transmission unit 62, and a process of deriving coordinates x and y of the pen 2 and receiving data Res transmitted by the pen 2 based on the downlink signal DS supplied from the reception unit 63 to output the coordinates x and y and the data Res along with the local ID of the pen 2 to the electronic device control unit 33. The logic unit 61 is configured to output control signals ctrl_t1 to ctrl_t4 and ctrl_r on the basis of the control of the MCU 60.

The MCU 60 is configured to transmit the uplink signal US and receive the downlink signal DS according to the transmission and reception schedule illustrated in FIG. 2. As described in detail later with reference to FIG. 11, the MCU 60 has three transmission modes of the uplink signal US, including an old and new mixed mode, an old only mode, and a new only mode. In the old and new mixed mode, the MCU 60 alternately sets, in a defined ratio (for example, 1:1), frames F (first frames) for transmitting the uplink signals US1 for the old protocol and frames F (second frames) for transmitting the uplink signals US2 for the new protocol. In the old only mode, the MCU 60 transmits the uplink signals US1 for the old protocol in all of the frames F. In the new only mode, the MCU 60 transmits the uplink signals US2 for the new protocol in all of the frames F.

As also described in detail later with reference to FIG. 11, the MCU 60 has three reception modes of the downlink signal DS in the time slots TS, including a discovery mode, an old mode, and a new mode. In the time slot TS of the discovery mode, the MCU 60 waits for the reception of the downlink signal DS transmitted by an unpaired pen 2. In the time slot TS of the old mode, the MCU 60 waits for the reception of the downlink signal DS generated by the pen 2 according to the old protocol. On the other hand, in the time slot TS of the new mode, the MCU 60 waits for the reception of the downlink signal DS generated by the pen 2 according to the new protocol. Hereinafter, the downlink signal DS generated according to the old protocol will be referred to as a "downlink signal DS1," and the downlink signal DS generated according to the new protocol will be referred to as a "downlink signal DS2."

The reception mode of the downlink signal DS is provided independently of the transmission mode of the uplink signal US. Thus, there is a case in which the MCU 60 detects both the downlink signals DS1 and DS2 in the frame F in which the uplink signal US1 is transmitted, and there is also a case in which the MCU 60 detects both the downlink signals DS1 and DS2 in the frame F in which the uplink signal US2 is transmitted.

Figure 7A:
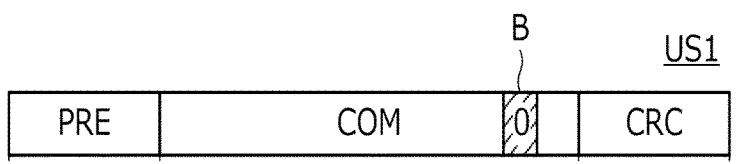
FIG. 7A depicts a configuration example of an uplink signal.

FIG. 7A depicts a configuration example of the uplink signal US1, and FIGS. 7B to 7G respectively depict configuration examples of the uplink signal US2. The uplink signals US1 and US2 have the configuration illustrated in FIG. 4 and include a common part. However, the uplink signals US1 and US2 have differences due to the difference in protocol. The details of the differences are not limited to any particular example, and there can be various modes. FIGS. 7B to 7G illustrate six of the modes. Each mode will be described in detail.

Figure 7B:
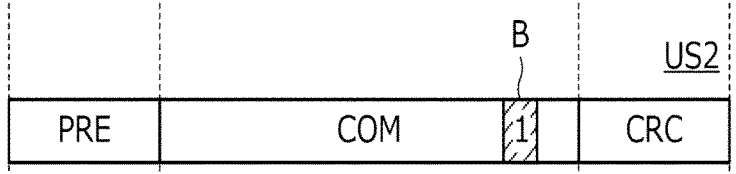
FIGS. 7B to 7G depict configuration examples of an uplink signal.

FIG. 7B is an example in which the value of a bit B set to a first value (for example, "0") in the old protocol is set to a second value (for example, "1") different from the first value in the new protocol. In this case, after decoding the received uplink signal US, the pen 2b that is the new pen can refer to the value of the bit B to determine whether the uplink signal US is the uplink signal US1 or the uplink signal US2. On the other hand, after decoding the received uplink signal US, the pen 2a that is the old pen determines that the uplink signal US is normally received if the bit B has the first value and determines that an abnormality is detected in the decoding of the command if the bit B has the second value. In the former case, the pen 2b determines that the received uplink signal US is the uplink signal NUS that is normally received. In the latter case, the pen 2a determines that the received uplink signal US is the uplink signal SUS in the special state.

Note that the uplink signal US2 of FIG. 7B can be used when, for example, there is a reserved field in the uplink signal US1. Although the value of the reserved field does not have a specific meaning, the reserved field usually has a specific value (for example "0"). How the bit will be assigned to the field in the new protocol cannot be specifically estimated at the time of design of the old protocol. However, a value (for example, "1") different from the specific value can be set in the field at the time of design of the new protocol, and the pen 2a can recognize that an unusual (unexpected) value is set in the field when the pen 2a receives the uplink signal US1. Thus, the pen 2a can determine that the uplink signal US is the uplink signal SUS in the special state.

Figure 7C:
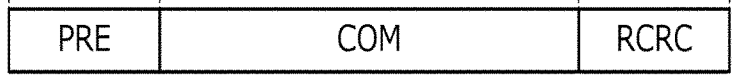

FIG. 7C is an example in which, in the new protocol, in place of the error detection code CRC obtained by performing a predetermined operation using the command signal COM as an input, a reversed error detection code RCRC obtained by reversing the error detection code CRC is included in the uplink signal US. In this case, the pen 2b that is the new pen can extract the part corresponding to the error detection code CRC or the reversed error detection code RCRC from the received uplink signal US. The pen 2b can attempt to detect an error without reversing the part and attempt to detect an error after reversing the part, to determine whether the uplink signal US is the uplink signal US1 or the uplink signal US2. Thus, the pen 2b can determine that the uplink signal US2 is received when an error is not detected as a result of the error detection after the reversal of the extracted part. The pen 2b can determine that the uplink signal US1 is received when an error is not detected as a result of the error detection without the reversal of the extracted part. On the other hand, in the pen 2a that is the old pen, the decoding result includes a codeword (that is, an error is not detected by the error detection code) if the error detection code CRC is included in the received uplink signal US, and the decoding result does not include a codeword (that is, an error is detected by the error detection code) if the reversed error detection code RCRC is included in the received uplink signal US. Thus, the pen 2a determines that the received uplink signal US is the uplink signal NUS when the decoding result includes a codeword or when the reversed value is included in the field of CRC in the case where the decoding result does not include a codeword. The pen 2a determines that the received uplink signal US is the uplink signal SUS in the special state when the decoding result does not include a codeword. In this way, the CRC field existing in the old protocol can be used without using a new field as in FIG. 7B, to indicate that a command adapted to the new protocol is issued.

Figure 7D:
Figure 7E:
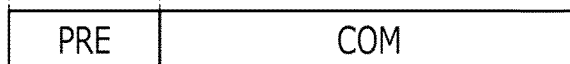
Figure 7F:
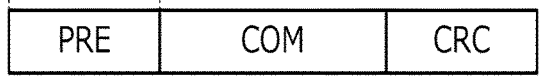
Figure 7G:

FIG. 7D illustrates an example in which the preamble PRE of the new protocol is longer than the preamble PRE of the old protocol. FIG. 7E illustrates an example in which the error detection code CRC is not provided in the new protocol unlike in the old protocol. FIG. 7F illustrates an example in which the time length of the command signal COM of the new protocol is shorter than the time length of the command signal COM of the old protocol due to the use of multiple values or the like. FIG. 7G illustrates an example in which the error detection code CRC is not provided in the new protocol unlike in the old protocol, and the time length of the command signal COM of the new protocol is shorter than the time length of the command signal COM of the old protocol due to the use of multiple values or the like. In all of the cases, the pen 2b that is the new pen can attempt to decode the received uplink signal US by assuming that the uplink signal US is either of the uplink signals US1 and US2, and the pen 2b can determine whether the uplink signal US is the uplink signal US1 or the uplink signal US2. On the other hand, the pen 2a that is the old pen handles the uplink signal US as only the uplink signal US1 in decoding the uplink signal US, and thus, an abnormal result is obtained when the uplink signal US is the uplink signal US2. Therefore, the pen 2a determines that the received uplink signal US is the uplink signal NUS when a normal decoding result is obtained, and the pen 2a determines that the received uplink signal US is the uplink signal SUS in the special state when an abnormal decoding result is obtained.

Note that, when the preamble PRE used in the old protocol and the preamble PRE used in the new protocol are different as in the example illustrated in FIG. 7D, the preambles PRE may be configured to only partially coincide with each other, such as a partial match (including a match in which the result of a correlation operation is equal to or greater than a predetermined value) of the chip width of the spread code (a time length per chip, that is, a fundamental frequency or an integer multiple of the frequency of the chip (pulse)), a partial match of the code (chip sequence) included in the spread code, and a partial match of the top (initial) parts of the preambles PRE including patterns of a plurality of spread codes. In this case, the pen 2a that is the old pen may determine that the received uplink signal US is the uplink signal SUS in the special state when the pen 2a obtains an abnormal decoding result and detects the partial match. This can prevent the pen 2a from determining that the uplink signal SUS in the special state is received even in a case of a decoding error caused by noise or the like.

Figure 8A:
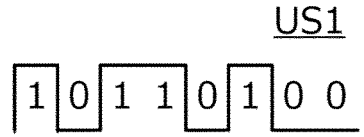
FIG. 8A depicts an example of a spread code included in a preamble used in an old protocol.
Figure 8B:
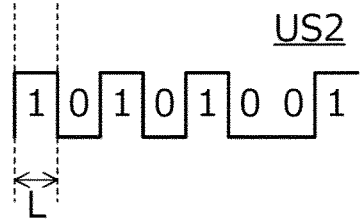
FIG. 8B depicts an example of a spread code included in a preamble used in a new protocol.

FIG. 8A illustrates an example of the spread code included in the preamble PRE used in the old protocol, and FIG. 8B illustrates an example of the spread code included in the preamble PRE used in the new protocol. Although the preamble PRE used in the old protocol and the preamble PRE used in the new protocol are different in the examples, chip widths L of the spread code are the same. When the preambles PRE as in the example are used, the pen 2a that is the old pen can determine that the received uplink signal US is the uplink signal SUS in the special state if the pen 2a obtains an abnormal decoding result (including a result indicating that the preambles PRE (or the uplink signals US) do not march as a whole) and also detects the chip width L matches. This similarly applies to a case in which the pen 2a detects, in place of or in addition to the chip width L match, the partial match of the codes included in the spread codes or the partial match of the preambles PRE.

FIG. 6 will be further described. The transmission unit 62 is a circuit that generates the uplink signal US according to the control of the MCU 60 and the logic unit 61, and the transmission unit 62 includes a pattern supply unit 80, a switch 81, a code sequence holding unit 82, a spread processing unit 83, and a transmission guard unit 84 as illustrated in FIG. 6. Although the pattern supply unit 80 among these is particularly described as being included in the transmission unit 62 in the present embodiment, the pattern supply unit 80 may be included in the MCU 60.

The pattern supply unit 80 is a functional unit that outputs symbols included in the preamble PRE, according to the instruction of the control signal ctrl_t1 supplied from the logic unit 61. The symbols included in the preamble PRE include, for example, symbols dedicated to a preamble that are not associated with any of 0 to 15.

The switch 81 plays a role of selecting one of the pattern supply unit 80 and the MCU 60 on the basis of the control signal ctrl_t2 supplied from the logic unit 61 and supplying the output of the selected one to the spread processing unit 83. When the switch 81 selects the pattern supply unit 80, the symbols included in the preamble PRE are supplied from the pattern supply unit 80 to the spread processing unit 83. On the other hand, when the switch 81 selects the MCU 60, the command signal COM and the error detection code CRC are supplied from the MCU 60 to the spread processing unit 83. Each of the command signal COM and the error detection code CRC supplied to the spread processing unit 83 includes, for example, a sequence of symbols associated with any of 0 to 15.

The code sequence holding unit 82 has a function of generating a spread code PN in a predetermined chip length with autocorrelation characteristics, on the basis of the control signal ctrl_t3 supplied from the logic unit 61, and holding the spread code PN. The code sequence holding unit 82 holds different spread codes PN corresponding to the types of symbols. The spread codes PN held in the code sequence holding unit 82 are supplied to the spread processing unit 83.

The spread processing unit 83 has a function of using corresponding one of the plurality of spread codes PN held in the code sequence holding unit 82, to spread the values of the symbols (preamble PRE or command signal COM) supplied through the switch 81 and thereby obtain a transmission chip sequence. The spread processing unit 83 is configured to supply the acquired transmission chip sequence to the transmission guard unit 84.

The transmission guard unit 84 has a function of inserting a guard period (a period in which signals are not transmitted or received), which is necessary for switching the transmission operation and the reception operation, between the transmission period of the uplink signal US and the reception period of the downlink signal DS, on the basis of the control signal ctrl_t4 supplied from the logic unit 61.

The reception unit 63 is a circuit that receives the downlink signal DS transmitted by the pen 2, on the basis of the control signal ctrl_r supplied from the logic unit 61. Specifically, the reception unit 63 includes an amplification circuit 85, a detection circuit 86, and an analog-to-digital (AD) converter 87.

The amplification circuit 85 amplifies the downlink signal DS supplied from the selection unit 64 and outputs the downlink signal DS. The detection circuit 86 is a circuit that generates a voltage corresponding to the level of the output signal of the amplification circuit 85. The AD converter 87 is a circuit that samples the voltage output from the detection circuit 86, at predetermined time intervals, to generate a digital signal. The digital signal output by the AD converter 87 is supplied to the MCU 60. The MCU 60 acquires the data Res (such as a pen pressure value and a pen ID) transmitted by the pen 2, on the basis of the digital signal supplied in this way.

The selection unit 64 includes switches 88x and 88y and conductor selection circuits 89x and 89y.

Each of the switches 88x and 88y is a single-pole, double-throw switch element that connects a common terminal and one of a T terminal and an R terminal. The common terminal of the switch 88x is connected to the conductor selection circuit 89x, the T terminal is connected to the output end of the transmission unit 62, and the R terminal is connected to the input end of the reception unit 63. The common terminal of the switch 88y is connected to the conductor selection circuit 89y, the T terminal is connected to the output end of the transmission unit 62, and the R terminal is connected to the input end of the reception unit 63.

The conductor selection circuit 89x is a switch element that selectively connects the plurality of linear electrodes 30X to the common terminal of the switch 88x. The conductor selection circuit 89x can also simultaneously connect some or all of the plurality of linear electrodes 30X to the common terminal of the switch 88x.

The conductor selection circuit 89y is a switch element that selectively connects the plurality of linear electrodes 30Y to the common terminal of the switch 88y. The conductor selection circuit 89y can also simultaneously connect some or all of the plurality of linear electrodes 30Y to the common terminal of the switch 88y.

Four control signals sTRx, sTRy, selX, and selY are supplied from the logic unit 61 to the selection unit 64. Specifically, the control signal sTRx is supplied to the switch 88x. The control signal sTRy is supplied to the switch 88y. The control signal selX is supplied to the conductor selection circuit 89x. The control signal selY is supplied to the conductor selection circuit 89y. The logic unit 61 uses the control signals sTRx, sTRy, selX, and selY to control the selection unit 64 and thereby realize the transmission of the uplink signal US and the reception of the downlink signal DS.

More specifically, in a case of transmitting the uplink signal US, the logic unit 61 controls the selection unit 64 to connect all of the plurality of linear electrodes 30Y (or all of the plurality of linear electrodes 30X) to the output end of the transmission unit 62.

The operation of the logic unit 61 in receiving the position signal PS included in the downlink signal DS varies depending on whether or not the sensor controller 31 is paired with the pen 2 within the time slot TS in which the position signal PS is received. In the time slot TS in which the sensor controller 31 is not paired with the pen 2, the logic unit 61 controls the selection unit 64 to sequentially connect all of the plurality of linear electrodes 30X and 30Y to the input end of the reception unit 63 within a continuation period of the time slot TS. In this way, the MCU 60 can acquire the reception strength of the position signal PS in each of the linear electrodes 30X and 30Y and can detect the position of the pen 2 on the entire touch surface (global scan). On the other hand, within the time slot TS in which the sensor controller 31 is paired with the pen 2, the logic unit 61 controls the selection unit 64 to sequentially connect, to the input end of the reception unit 63, a predetermined number of linear electrodes 30X and 30Y positioned near the position detected last time, while the transmission of the position signal PS continues. In this way, the MCU 60 can acquire the reception strength of the position signal PS in each of the predetermined number of linear electrodes 30X and 30Y positioned near the position detected last time and can update the position of the pen 2 (local scan).

The logic unit 61 in receiving the data signal DATA included in the downlink signal DS controls the selection unit 64 to connect, to the input end of the reception unit 63, only one of the plurality of linear electrodes 30X and 30Y that is closest to the position derived based on the most recent position signal PS regarding the pen 2 that transmits the data signal DATA. This can fully utilize the transmission time of the data signal DATA for transmitting the data from the pen 2 to the sensor controller 31.

The configurations of the pen 2 and the electronic device 3 included in the position detection system 1 have been described, and the uplink signal US and the downlink signal DS have been described. Next, the operations of the pen 2 and the electronic device 3 will be described in more detail with reference to mode transition diagrams of the pen 2 and the electronic device 3.

Figure 9:
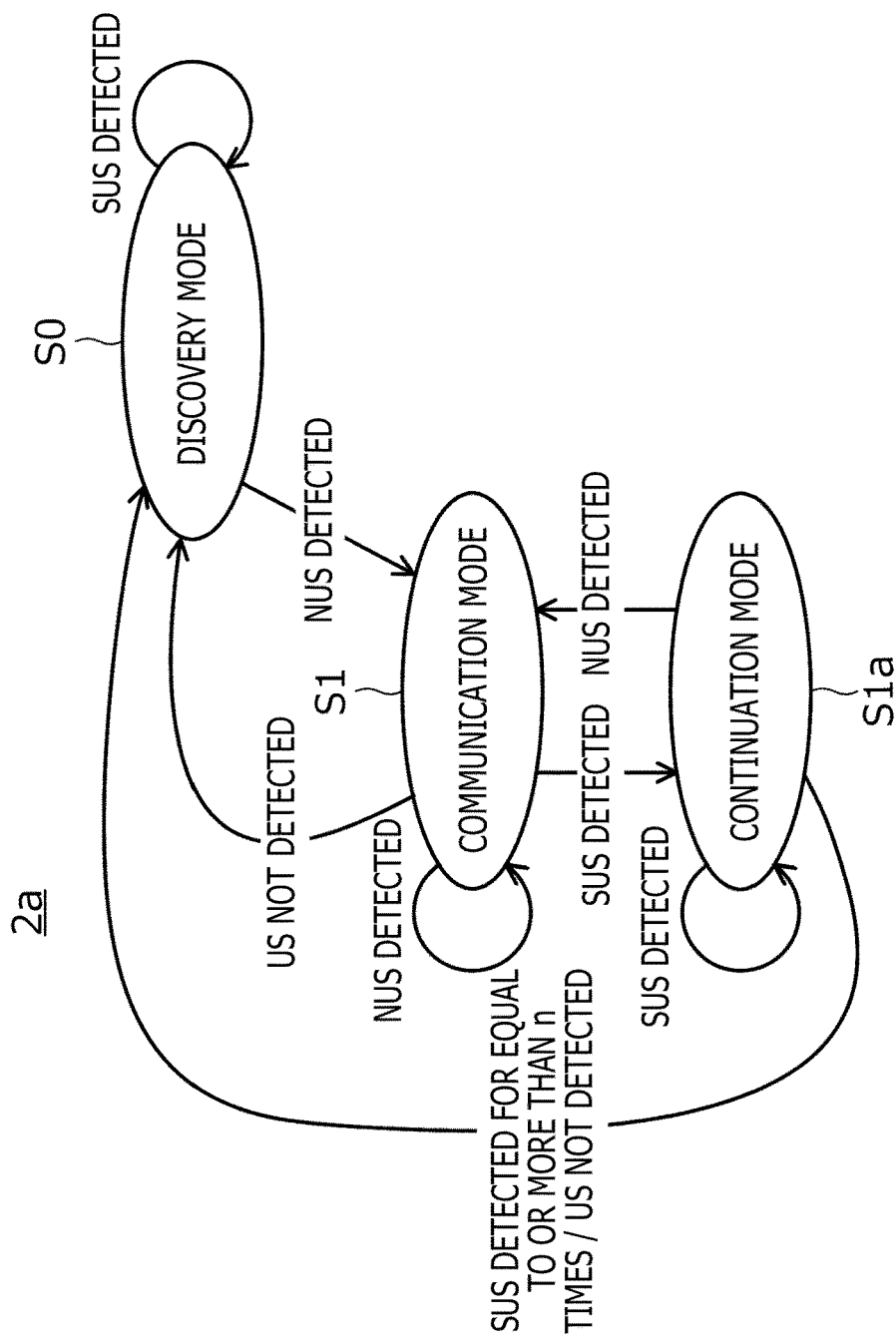
FIG. 9 is a mode transition diagram of a pen that is an old pen.

FIG. 9 is a mode transition diagram of the pen 2a that is the old pen. As illustrated in FIG. 9, the pen 2a is operated in one of the discovery mode S0, the communication mode S1, and the continuation mode S1a.

The discovery mode S0 is a mode for discovering the sensor controller 31. The pen 2a in the discovery mode S0 intermittently or continuously executes the detection operation of the uplink signal US. When the uplink signal NUS is received, the pen 2a determines the transmission and reception schedule of the uplink signal US and the downlink signal DS on the basis of the reception timing of the uplink signal NUS and shifts to the communication mode S1. On the other hand, when the uplink signal SUS is received, the pen 2a stays in the discovery mode S0 and attempts to receive the next uplink signal US.

The pen 2a in the communication mode S1 stays in the communication mode S1 to communicate with the sensor controller 31 while the uplink signal NUS is received according to the transmission and reception schedule. Specifically, the pen 2a updates the transmission and reception schedule according to the reception timing of the received uplink signal NUS and transmits the downlink signal DS according to the updated transmission and reception schedule. The downlink signal DS transmitted in this way is a signal generated by the pen 2a according to the old protocol, and the downlink signal DS includes data instructed, by the command COMDATA in the most recent uplink signal NUS, to be transmitted or default data such as a pen pressure value.

On the other hand, when the uplink signal US is not received according to the transmission and reception schedule, the pen 2a determines that the pen 2a is separated from the sensor controller 31 and returns to the discovery mode S0. When the uplink signal SUS is received instead of the next uplink signal NUS being normally received according to the transmission and reception schedule (that is, in a period in which the next uplink signal NUS can be received), the pen 2a shifts to the continuation mode S1a.

When the uplink signal SUS is received, the pen 2a in the continuation mode S1a updates the transmission and reception schedule according to the reception timing of the uplink signal SUS, but transmits the downlink signal DS according to the old protocol. Specifically, the pen 2a transmits the downlink signal DS including the data according to the command included in the uplink signal NUS received before the period, or including the default data such as a pen pressure value.

On the other hand, when the uplink signal NUS is received, the pen 2a returns to the communication mode S1. When the uplink signal SUS is continuously detected (that is, without the uplink signal NUS being detected) for equal to or more than n times (n is, for example, any natural number equal to or greater than 2) or when the uplink signal US is not received according to the transmission and reception schedule, the pen 2a returns to the discovery mode S0.

Figure 10:
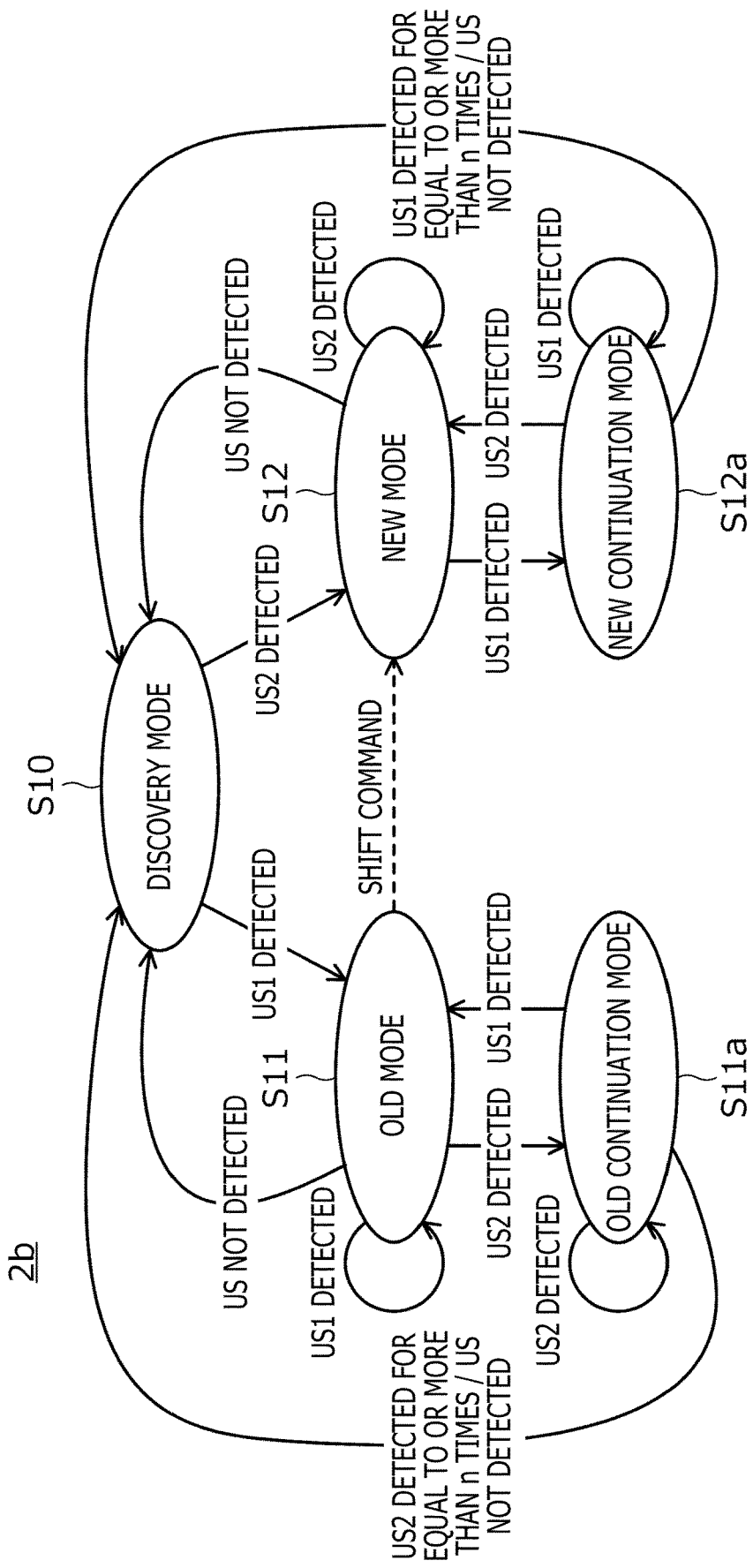
FIG. 10 is a mode transition diagram of a pen that is a new pen.

FIG. 10 is a mode transition diagram of the pen 2b that is the new pen. As illustrated in FIG. 10, the pen 2b is operated in one of the discovery mode S10, the old mode S11, the old continuation mode S11a, the new mode S12, and the new continuation mode S12a.

The discovery mode S10 is a mode for discovering the sensor controller 31, just like the discovery mode S0 of the pen 2a illustrated in FIG. 9. The pen 2b in the discovery mode S10 intermittently or continuously executes the detection operation of the uplink signal US. When the uplink signal US1 is received, the pen 2b determines the transmission and reception schedule of the uplink signal US and the downlink signal DS on the basis of the reception timing of the uplink signal US1 and shifts to the old mode S11. On the other hand, when the uplink signal US2 is received, the pen 2b determines the transmission and reception schedule of the uplink signal US and the downlink signal DS on the basis of the reception timing of the uplink signal US2 and shifts to the new mode S12.

The pen 2b in the old mode S11 stays in the old mode S11 to communicate with the sensor controller 31 while the uplink signal US1 is received according to the transmission and reception schedule. Specifically, the pen 2b updates the transmission and reception schedule according to the reception timing of the received uplink signal US (including the uplink signals US1 and US2) and transmits the downlink signal DS according to the updated transmission and reception schedule. The downlink signal DS transmitted in this way is a signal generated by the pen 2b according to the old protocol, and the downlink signal DS includes data instructed, by the command COMDATA in the most recent uplink signal US1, to be transmitted or default data such as a pen pressure value.

On the other hand, when the uplink signal US is not received according to the transmission and reception schedule, the pen 2b determines that the pen 2b is separated from the sensor controller 31 and returns to the discovery mode S10. When the uplink signal US2 is received according to the transmission and reception schedule, the pen 2b shifts to the old continuation mode S11a.

When the uplink signal US2 is received, the pen 2b in the old continuation mode S11a updates the transmission and reception schedule according to the reception timing of the uplink signal US2, but transmits the downlink signal DS according to the old protocol. Specifically, the pen 2b transmits the downlink signal DS including the data according to the command included in the uplink signal US1 received before, or including the default data such as a pen pressure value.

On the other hand, when the uplink signal US1 is received, the pen 2b returns to the old mode S11. When the uplink signal US2 is continuously detected (that is, without the uplink signal US1 being detected) for equal to or more than n times (n is, for example, any natural number equal to or greater than 2) or when the uplink signal US is not received according to the transmission and reception schedule, the pen 2b returns to the discovery mode S10.

It is preferable that the pen 2b shift to the new mode S12 as indicated by a dashed line in FIG. 10, when the command COMDATA included in the received uplink signal US1 is a shift command instructing a shift of mode. Accordingly, the instruction from the sensor controller 31 can forcibly switch the mode of the pen 2b to the new mode S12.

The pen 2b in the new mode S12 stays in the new mode S12 to communicate with the sensor controller 31 while the uplink signal US2 is received according to the transmission and reception schedule. Specifically, the pen 2b updates the transmission and reception schedule according to the reception timing of the received uplink signal US (including the uplink signals US1 and US2) and transmits the downlink signal DS according to the updated transmission and reception schedule. The downlink signal DS transmitted in this way is a signal generated by the pen 2*b* according to the new protocol, and the downlink signal DS includes data instructed, by the command COMDATA in the most recent uplink signal US2, to transmitted or default data such as a pen pressure value.

On the other hand, when the uplink signal US is not received according to the transmission and reception schedule, the pen 2*b* determines that the pen 2*b* is separated from the sensor controller 31 and returns to the discovery mode S10. When the uplink signal US1 is received according to the transmission and reception schedule, the pen 2*b* shifts to the new continuation mode S12*a*.

When the uplink signal US1 is received, the pen 2*b* in the new continuation mode S12*a* updates the transmission and reception schedule according to the reception timing of the uplink signal US1, but transmits the downlink signal DS according to the new protocol. Specifically, the pen 2*b* transmits the downlink signal DS including the data according to the command included in the uplink signal US2 received before. or including the default data such as a pen pressure value.

On the other hand, when the uplink signal US2 is received, the pen 2*b* returns to the new mode S12. When the uplink signal US1 is continuously detected (that is, without the uplink signal US2 being detected) for equal to or more than n times (n is, for example, any natural number equal to or greater than 2) or when the uplink signal US is not received according to the transmission and reception schedule, the pen 2*b* returns to the discovery mode S10.

Figure 11:
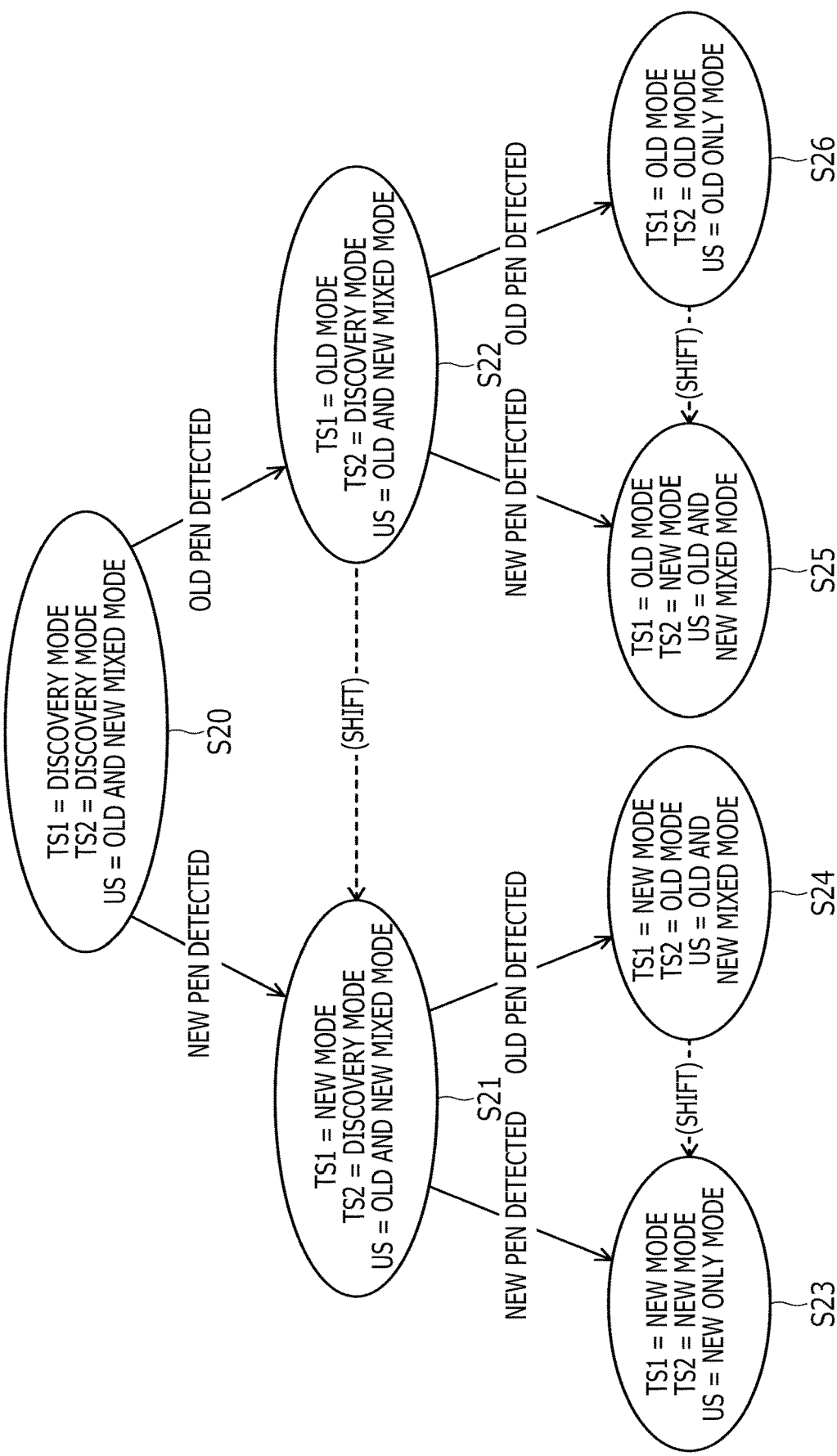
FIG. 11 is a mode transition diagram of the sensor controller.

FIG. 11 is a mode transition diagram of the sensor controller 31. As illustrated in FIG. 11, the sensor controller 31 operates in one of reception modes of the downlink signal DS in each time slot TS as well as operating in one of transmission modes of the uplink signal US. The reception modes include a discovery mode, an old mode, and a new mode, and the transmission modes include an old and new mixed mode, an old only mode, and a new only mode. FIGS. 12A to 13C are explanatory diagrams for describing mode transitions of the sensor controller 31. The mode transitions of the sensor controller 31 will be described below with reference to FIGS. 11 to 13C.

First, a state S20 illustrated in FIG. 11 is an initial state in which the sensor controller 31 is not paired with any pen 2. In the state S20, the reception mode of each of two time slots TS1 and TS2 is the discovery mode, and the transmission mode of the uplink signal US is the old and new mixed mode. In this case, the sensor controller 31 alternately sets, in a defined ratio, the frames F for transmitting the uplink signals US1 for the old protocol and the frames F for transmitting the uplink signals US2 for the new protocol. Although it is preferable that the ratio be 1:1, the ratio does not have to be 1:1.

Figure 12A:
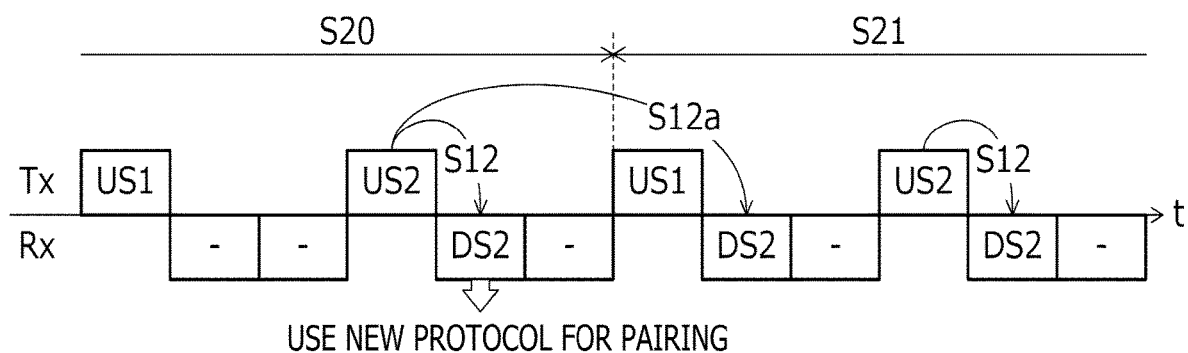
FIGS. 12A to 12C are explanatory diagrams for describing mode transitions of the sensor controller.

In a case illustrated in FIG. 12A, the sensor controller 31 in the state S20 receives the downlink signal DS2 in the time slot TS1 of the frame F in which the uplink signal US2 is transmitted. The pen 2 that transmits the first downlink signal DS2 in response to the uplink signal US2 is the pen 2*b*, and the pen 2*b* enters the new mode S12 illustrated in FIG. 10 at the time of the transmission of the downlink signal DS2. The sensor controller 31 uses the new protocol to pair with the pen 2 that has transmitted the detected downlink signal DS2 and sets the reception mode of the downlink signal DS in the time slot TS1 to the new mode (state S21 in FIG. 11). As a result, communication based on the new protocol is performed in the time slot TS1.

Figure 12B:
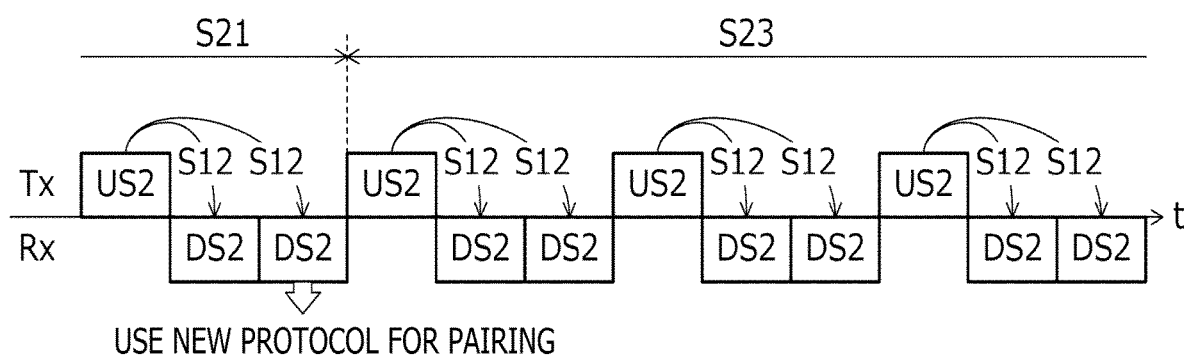

In a case illustrated in FIG. 12B, the sensor controller 31 in the state S21 receives the downlink signal DS2 in the time slot TS2 of the frame F in which the uplink signal US2 is transmitted. The pen 2 that transmits the downlink signal DS2 is also the pen 2*b* (a pen 2*b* different from the pen 2*b* that transmits the downlink signal DS2 in the time slot TS1; the same applies hereinafter), and the pen 2*b* enters the new mode S12 illustrated in S10 at the time of the transmission of the downlink signal DS2. The sensor controller 31 uses the new protocol to pair with the pen 2 that has transmitted the detected downlink signal DS2. The sensor controller 31 sets the reception mode of the downlink signal DS in the time slot TS2 to the new mode and sets the transmission mode of the uplink signal US to the new only mode (state S23 in FIG. 11). As a result, communication based on the new protocol is performed in both the time slots TS1 and TS2, and only the uplink signal US2 is transmitted as the uplink signal US.

Figure 12C:
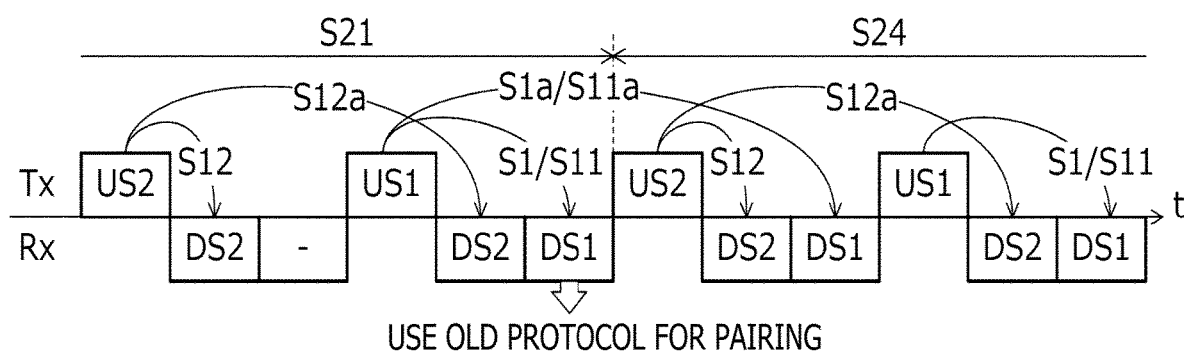

In a case illustrated in FIG. 12C, the sensor controller 31 in the state S21 receives the downlink signal DS1 in the time slot TS2 of the frame F in which the uplink signal US1 is transmitted. The pen 2 that transmits the downlink signal DS1 can be either one of the pen 2*a* and the pen 2*b*. In the case of the pen 2*a*, the pen 2*a* enters the communication mode S1 illustrated in FIG. 9 at the time of the transmission of the downlink signal DS1. In the case of the pen 2*b*, the pen 2*b* enters the old mode S11 illustrated in FIG. 10 at the time of the transmission of the downlink signal DS1. The sensor controller 31 uses the old protocol to pair with the pen 2 that has transmitted the detected downlink signal DS1 and sets the reception mode of the downlink signal DS in the time slot TS2 to the old mode (state S24 in FIG. 11). As a result, communication based on the new protocol is performed in the time slot TS1, and communication based on the old protocol is performed in the time slot TS2.

Figure 13A:
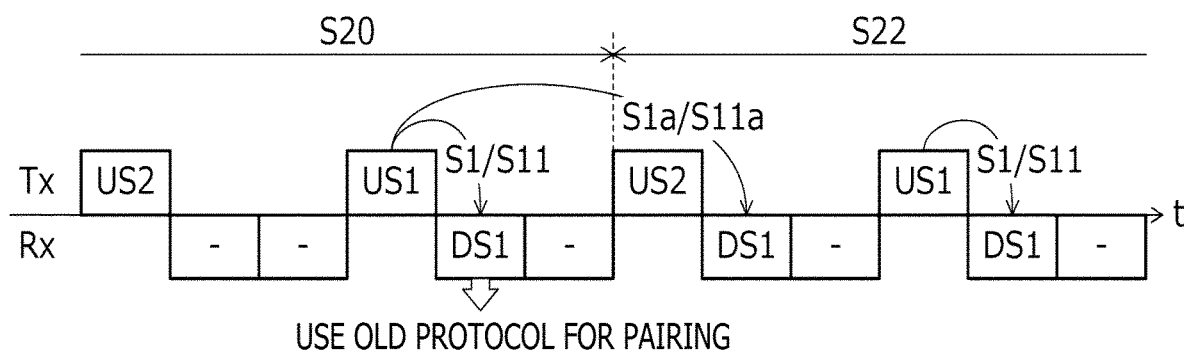
FIGS. 13A to 13C are explanatory diagrams for describing mode transitions of the sensor controller.

In a case illustrated in FIG. 13A, the sensor controller 31 in the state S20 receives the downlink signal DS1 in the time slot TS1 of the frame F in which the uplink signal US1 is transmitted. The pen 2 that transmits the first downlink signal DS1 in response to the uplink signal US1 can be either one of the pen 2*a* and the pen 2*b*. In the case of the pen 2*a*, the pen 2*a* enters the communication mode S1 illustrated in FIG. 9 at the time of the transmission of the downlink signal DS1. In the case of the pen 2*b*, the pen 2*b* enters the old mode S11 illustrated in FIG. 10 at the time of the transmission of the downlink signal DS1. The sensor controller 31 uses the old protocol to pair with the pen 2 that has transmitted the detected downlink signal DS1 and sets the reception mode of the downlink signal DS in the time slot TS1 to the old mode (state S22 in FIG. 11). As a result, communication based on the old protocol is performed in the time slot TS1.

Figure 13B:
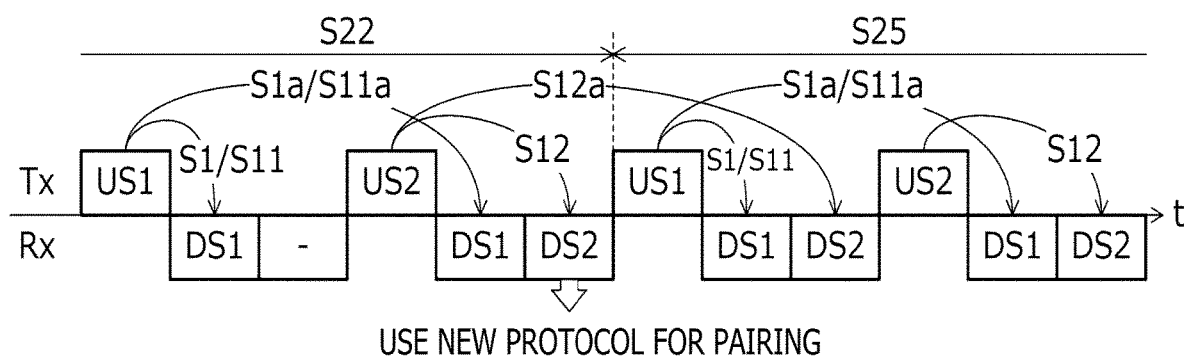

In a case illustrated in FIG. 13B, the sensor controller 31 in the state S22 receives the downlink signal DS2 in the time slot TS2 of the frame F in which the uplink signal US2 is transmitted. The pen 2 that transmits the downlink signal DS2 is the pen 2*b*, and the pen 2*b* enters the new mode S12 illustrated in FIG. 10 at the time of the transmission of the downlink signal DS2. The sensor controller 31 uses the new protocol to pair with the pen 2 that has transmitted the detected downlink signal DS2 and sets the reception mode of the downlink signal DS in the time slot TS2 to the new mode (state S25 in FIG. 11). As a result, communication based on the old protocol is performed in the time slot TS1, and communication based on the new protocol is performed in the time slot TS2.

Figure 13C:
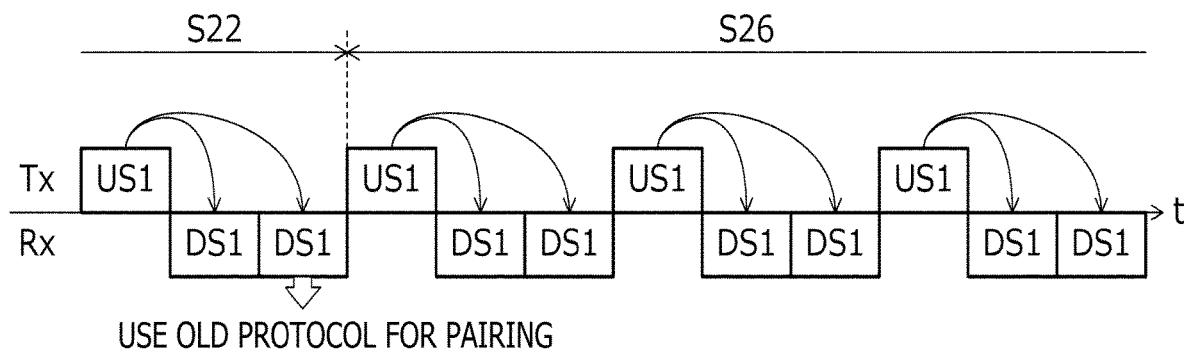

In a case illustrated in FIG. 13C, the sensor controller 31 in the state S22 receives the downlink signal DS1 in the time slot TS2 of the frame F in which the uplink signal US1 is transmitted. The pen 2 that transmits the downlink signal DS1 can be either one of the pen 2a and the pen 2b. In the case of the pen 2a, the pen 2a enters the communication mode S1 illustrated in FIG. 9 at the time of the transmission of the downlink signal DS1. In the case of the pen 2b, the pen 2b enters the old mode S11 illustrated in FIG. 10 at the time of the transmission of the downlink signal DS1. The sensor controller 31 uses the old protocol to pair with the pen 2 that has transmitted the detected downlink signal DS1. The sensor controller 31 sets the reception mode of the downlink signal DS in the time slot TS2 to the old mode and sets the transmission mode of the uplink signal US to the old only mode (state S26 in FIG. 11). As a result, communication based on the old protocol is performed in both the time slots TS1 and TS2, and only the uplink signal US1 is transmitted as the uplink signal US.

According to the operation, even if the pen 2 to be paired is the pen 2b corresponding to the new protocol, the communication is started based on the old protocol when the uplink signal US detected first after the pen 2b approaches the touch surface is the uplink signal US1. Thus, the sensor controller 31 refers to the bit A (see FIG. 2) included in the downlink signal DS1, to determine whether or not the pen 2 corresponds to the new protocol, when the communication is started based on the old protocol. If the sensor controller 31 determines that the pen 2 corresponds to the new protocol, the sensor controller 31 places, in the uplink signal US1 to be transmitted next, a shift command for instructing a shift to the communication based on the new protocol. This will be described in detail with reference to FIGS. 14A to 14C.

Figure 14A:
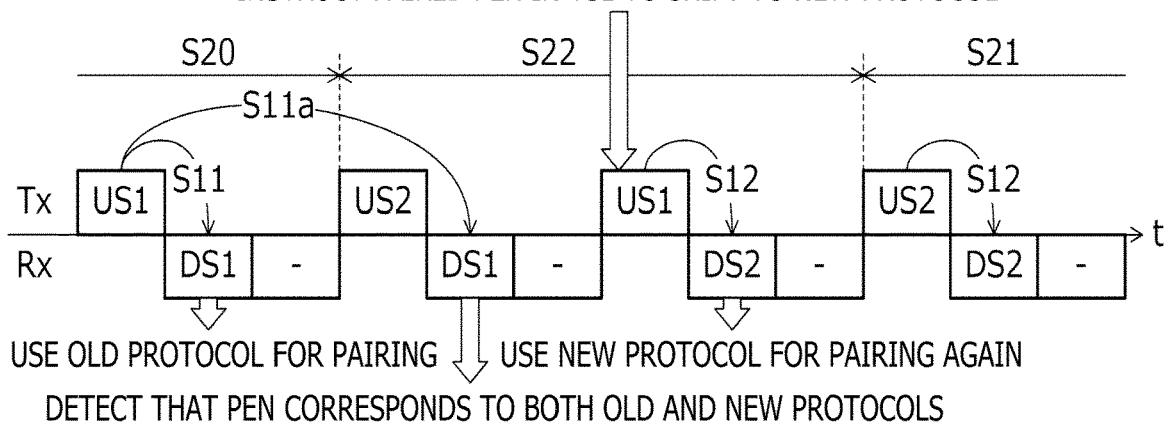
FIGS. 14A to 14C are explanatory diagrams for describing procedures of shifting communication between the sensor controller and the pen that are paired in the old protocol to communication in the new protocol.
Figure 14B:
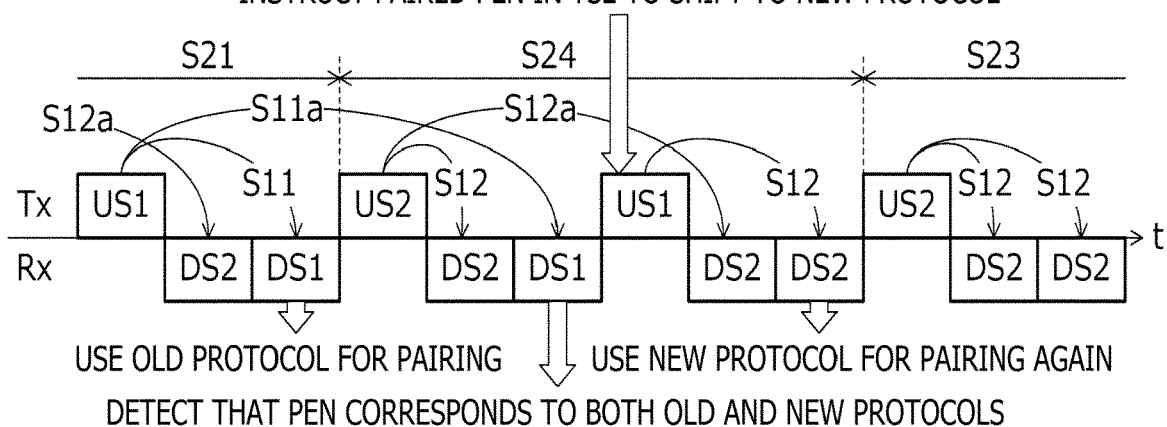
Figure 14C:
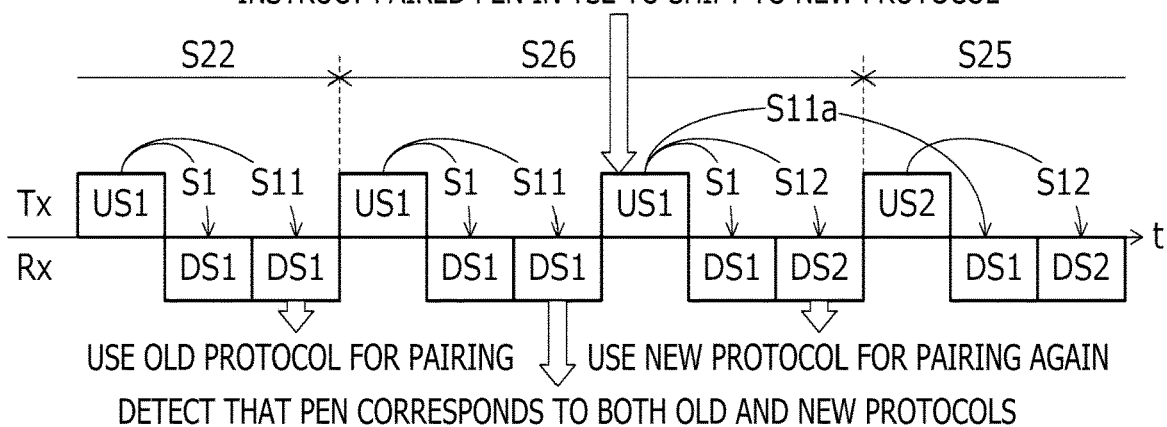

FIGS. 14A to 14C are explanatory diagrams for describing procedures of shifting the communication between the sensor controller 31 and the pen 2b that are paired in the old protocol to communication in the new protocol. FIG. 14A illustrates a procedure of shifting the communication with the pen 2b detected in the time slot TS1 in the state S20 illustrated in FIG. 11 to the new protocol. FIG. 14B illustrates a procedure of shifting the communication with the pen 2b detected in the time slot TS2 in the state S21 illustrated in FIG. 11 to the new protocol. FIG. 14C illustrates a procedure of shifting the communication with the pen 2b detected in the time slot TS2 in the state S22 illustrated in FIG. 11 to the new protocol. The procedures will be described sequentially.

FIG. 14A illustrates a case in which, when the sensor controller 31 is in the state S20, the pen 2b entering the old mode S11 in response to the uplink signal US1 uses the time slot TS1 to transmit the downlink signal DS1. The sensor controller 31 that has received the downlink signal DS1 uses the old protocol to pair with the pen 2b in the time slot TS1 and shifts to the state S22.

The sensor controller 31 then refers to the bit A (see FIG. 3B) included in the downlink signal DS1 transmitted by the pen 2b with which the sensor controller 31 has paired in the time slot TS1, to detect that the pen 2b corresponds to both the old protocol and the new protocol. Note that the bit A is included in the data signal DATA illustrated in FIG. 3B, and thus, the sensor controller 31 performs the detection after the shift to the local scan.

The sensor controller 31 that has detected that the pen 2b corresponds to both the old protocol and the new protocol uses the uplink signal US1 to be transmitted next, to transmit, to the pen 2b, the command COMDATA (shift command) for instructing the shift to the new protocol. The pen 2b that has received the command COMDATA enters the new mode S12 as described with reference to FIG. 10.

The sensor controller 31 that has received the downlink signal DS2 transmitted by the pen 2b in the new mode S12 uses the new protocol to pair with the pen 2b again and shifts to the state S21 in which the reception mode of the downlink signal DS in the time slot TS1 is the new mode. As a result of the procedure, the communication with the pen 2b detected in the time slot TS1 in the state S20 is shifted to the new protocol.

FIG. 14B illustrates a case in which, when the sensor controller 31 is in the state S21, the pen 2b entering the old mode S11 in response to the uplink signal US1 uses the time slot TS2 to transmit the downlink signal DS1. The sensor controller 31 that has received the downlink signal DS1 uses the old protocol to pair with the pen 2b in the time slot TS2 and shifts to the state S24.

The sensor controller 31 then refers to the bit A (see FIG. 3B) included in the downlink signal DS1 transmitted by the pen 2b with which the sensor controller 31 has paired in the time slot TS2, to detect that the pen 2b corresponds to both the old protocol and the new protocol. Consequently, the sensor controller 31 uses the uplink signal US1 to be transmitted next, to transmit, to the pen 2 with which the sensor controller 31 has paired in the time slot TS2, the command COMDATA (a shift command) for instructing the shift to the new protocol. The pen 2b that has received the command COMDATA enters the new mode S12 as described with reference to FIG. 10. The sensor controller 31 that has received the downlink signal DS2 transmitted by the pen 2b in the new mode S12 uses the new protocol to pair with the pen 2b again and shifts to the state S23 in which the reception mode of the downlink signal DS in the time slot TS2 is the new mode. As a result of the procedure, the communication with the pen 2b detected in the time slot TS2 in the state S21 is shifted to the new protocol.

Lastly, FIG. 14C illustrates a case in which, when the sensor controller 31 is in the state S22, the pen 2b entering the old mode S11 in response to the uplink signal US1 uses the time slot TS2 to transmit the downlink signal DS1. The sensor controller 31 that has received the downlink signal DS1 uses the old protocol to pair with the pen 2b in the time slot TS2 and shifts to the state S26.

The sensor controller 31 then refers to the bit A (see FIG. 3B) included in the downlink signal DS1 transmitted by the pen 2b with which the sensor controller 31 has paired in the time slot TS2, to detect that the pen 2b corresponds to both the old protocol and the new protocol. Consequently, the sensor controller 31 uses the uplink signal US1 to be transmitted next, to transmit, to the pen 2b with which the sensor controller 31 has paired in the time slot TS2, the command COMDATA (a shift command) for instructing the shift to the new protocol. The pen 2b that has received the command COMDATA enters the new mode S12 as described with reference to FIG. 10. The sensor controller 31 that has received the downlink signal DS2 transmitted by the pen 2b in the new mode S12 uses the new protocol to pair with the pen 2b again and shifts to the state S25 in which the reception mode of the downlink signal DS in the time slot TS2 is the new mode. As a result of the procedure, the communication with the pen 2b detected in the time slot TS2 in the state S22 is shifted to the new protocol.

In this way, according to the present embodiment, even if the sensor controller 31 uses the old protocol to pair with the pen 2b corresponding to the new protocol, the sensor controller 31 can use the new protocol to pair with the pen 2b again to start the communication based on the new protocol.

As described above, according to the present embodiment, the pen 2a corresponding to only the old protocol can be operated based on the uplink signal NUS received before, even if the pen 2a receives the uplink signal SUS in the special state (for example, the uplink signal US2 based on the new protocol) from the sensor controller 31. The pen 2b corresponding to both the old and new protocols can be operated based on the uplink signal US2 received before, even if the pen 2b receives the uplink signal US1 during the communication with the sensor controller 31 based on the new protocol. The pen 2b can be operated based on the uplink signal US1 received before, even if the pen 2b receives the uplink signal US2 during the communication with the sensor controller 31 based on the old protocol. The sensor controller 31 can also detect both the downlink signal DS1 generated according to the old protocol and the downlink signal DS2 generated according to the new protocol in each of the frame F for transmitting the uplink signal US1 and the frame F for transmitting the uplink signal US2. Thus, according to the present embodiment, both the pen 2a and the pen 2b can be used simultaneously in one electronic device 3.

According to the present embodiment, even if the sensor controller 31 uses the old protocol to pair with the pen 2b corresponding to the new protocol, the sensor controller 31 can transmit the shift command to cause the pen 2b to shift to the new mode S12. Thus, the sensor controller 31 can use the new protocol to communicate with the pen 2b corresponding to the new protocol.

Although the preferred embodiments of the present disclosure have been described, the present disclosure is not limited to the embodiments, and it is obvious that the present disclosure can be implemented in various modes.

For example, although the sensor controller 31 transmits the shift command to cause the pen 2b in the old mode S11 to shift to the new mode S12 in the embodiments, the pen 2b may autonomously shift to the new mode S12.

Figure 15:
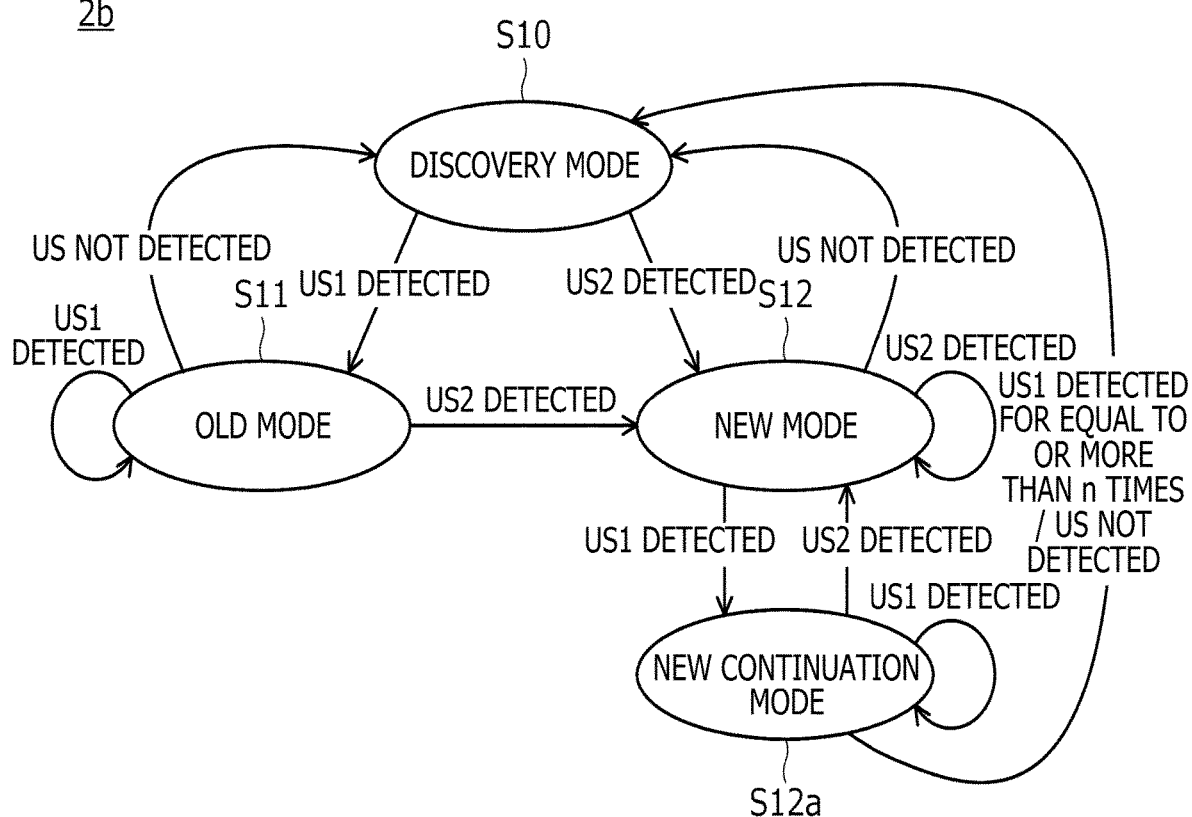
FIG. 15 is a mode transition diagram of the pen according to a first modification of the embodiment of the present disclosure.

FIG. 15 is a mode transition diagram of the pen 2b according to a first modification to the embodiment of the present disclosure. As illustrated in FIG. 15, when the pen 2b according to the present modification detects the uplink signal US2 in the old mode S11, the pen 2b shifts to the new mode S12 instead of the continuation mode S11a illustrated in FIG. 10. The continuation mode S11a is not provided in the example of FIG. 15. In this case also, the sensor controller 31 can use the new protocol to communicate with the pen 2b.

Although the number of pens 2 that can simultaneously be paired with the sensor controller 31 is two at most in the embodiments, the number of pens 2 that can simultaneously be paired with the sensor controller 31 is not limited to two.

FIG. 16 depicts a schedule of the transmission (Tx) and the reception (Rx) in the sensor controller 31 according to a second modification to the embodiment of the present disclosure. As illustrated in FIG. 16, two reception channels Rx1 and Rx2 of different frequencies are used in the present modification. Two time slots TS1 and TS2 are provided in the reception channel Rx1, and two time slots TS3 and TS4 are provided in the reception channel Rx2. Thus, the number of time slots that can be used to transmit the downlink signal DS is four in total, and according to the present modification, the number of pens 2 that can simultaneously be paired with the sensor controller 31 is four.

Note that, in the present modification, the old protocol may support only the reception channel Rx1, and the new protocol may support the reception channels Rx1 and Rx2. In this case, it is preferable that the pen 2b corresponding to the new protocol preferentially use the time slots TS3 and TS4. In this way, more pens 2 can be used simultaneously.

It is preferable that the sensor controller 31 according to the present modification change the transmission ratio of the uplink signals US1 and US2, according to the mixed state of the downlink signals DS1 generated according to the old protocol and the downlink signals DS2 generated according to the new protocol. Specifically, it is preferable to change the ratio such that the greater the number of received downlink signals DS2 with respect to the number of received downlink signals DS1, the higher the transmission rate of the uplink signals US2.

Although only the shift command for shifting the communication with the pen 2b from the old protocol to the new protocol is described as the shift command transmitted by the sensor controller 31 in the embodiments, the sensor controller 31 may transmit a shift command for shifting the communication with the pen 2b from the new protocol to the old protocol.

Although the sensor controller 31 uses the uplink signal US1 to transmit the shift command, in order to shift the communication with the pen 2b from the old protocol to the new protocol in the embodiments, the sensor controller 31 may use the uplink signal US2 to transmit the shift command. In this case, it is preferable that the pen 2b first decode the command signal COM in the uplink signal US2, to determine whether or not the shift command is included, even if the pen 2b is in the old mode S11 or the old continuation mode S11a. If the shift command is included, it is preferable that the pen 2b execute the operation according to the shift command, that is, the shift to the new mode S12.

Although the present disclosure is applied to the old and new protocols (backward compatible) in the examples described in the embodiments, the present disclosure can also be applied to a multi-pen environment in which different protocols are mixed. For example, the present disclosure can also be applied to two different protocols, in which the reference time of the frames is commonly determined by uplink signals and wherein a portion of the signals may be in common.

The invention claimed is:

1. A pen comprising:
reception circuitry configured to receive an uplink signal generated according to a first protocol; and
transmission circuitry configured to transmit, according to the first protocol, a downlink signal based on a reception timing of the uplink signal and a command included in the uplink signal, wherein,
in a case where the reception circuitry receives the uplink signal that is in a normal state (uplink signal NUS) in a first period, the transmission circuitry transmits the downlink signal including data according to the command included in the uplink signal NUS, and
in a case where the reception circuitry receives the uplink signal that is in a special state (uplink signal SUS) in a second period subsequent to the first period, the transmission circuitry transmits the downlink signal including data according to the command included in the uplink signal NUS received in the first period.

2. The pen according to claim 1, wherein the special state means that an abnormality is detected in decoding of the command included in the uplink signal SUS.

3. The pen according to claim 2, wherein the abnormality is that a decoding result does not include a codeword.

4. The pen according to claim 2, wherein
the uplink signal SUS includes an error detection code, and the abnormality is that an error is detected based on the error detection code.

5. The pen according to claim 2, wherein the abnormality is that a value of a first bit that is supposed to be a first value in the first protocol supported by the pen is a second value different from the first value.

6. The pen according to claim 5, wherein, in a second protocol not supported by the pen, the value of the first bit is supposed to be the second value.

7. The pen according to claim 1, wherein the transmission circuitry stops transmitting the downlink signal when the reception circuitry continues to receive the uplink signal SUS for a predetermined period.

8. The pen according to claim 1, wherein a transmission timing of the downlink signal is determined based on the reception timing of the uplink signal SUS.

9. The pen according to claim 1, wherein
the uplink signal NUS generated according to the first protocol supported by the pen includes a known synchronization signal, while the uplink signal SUS generated according to a second protocol not supported by the pen includes a synchronization signal which only partially matches the known synchronization signal, and
the special state means that the synchronization signal included in the uplink signal SUS matches only a part of the known synchronization signal and that an abnormality is detected in decoding of the command included in the uplink signal SUS.

10. The pen according to claim 9, wherein the part of the known synchronization signal corresponds to a chip width of a spread code used for spreading the known synchronization signal, or corresponds to a code included in the spread code.

11. The pen according to claim 9, wherein the part of the known synchronization signal is a top part of the known synchronization signal.

12. A pen, comprising:
reception circuitry configured to receive both a first uplink signal generated according to a first protocol and a second uplink signal generated according to a second protocol different from the first protocol,
control circuitry configured to control operation of the pen in at least two operation modes, and
transmission circuitry configured to transmit a downlink signal, wherein,
in a case where the reception circuitry receives the second uplink signal, the control circuitry enters a second operation mode according to the second protocol, and regardless of whether the reception circuitry operating in the second operation mode receives the first uplink signal according to the first protocol or the second uplink signal according to the second protocol, the transmission circuitry operating in the second operation mode transmits a second downlink signal according to the second protocol.

13. The pen according to claim 12, wherein, when the reception circuitry operating in the second operation mode detects only the first uplink signal without detecting the second uplink signal for more than a predetermined period, the control circuitry shifts to a discovery mode for discovering a sensor controller.

14. The pen according to claim 12, wherein, when the reception circuitry operating in a first operation mode according to the first protocol receives, through the first or second uplink signal, a command instructing entry into the second operation mode, the control circuitry shifts to the second operation mode.

15. The pen according to claim 12, wherein
in a case where the reception circuitry receives the first uplink signal, the control circuitry enters a first operation mode according to the first protocol, and the transmission circuitry transmits a first downlink signal according to the first protocol, and
the first downlink signal includes flag information indicating whether the pen supports only the first protocol or supports both the first and second protocols.

16. A sensor controller, comprising:
reception circuitry configured to detect both a first downlink signal generated according to a first protocol and a second downlink signal generated according to a second protocol different from the first protocol, and
transmission circuitry configured to transmit first uplink signals of the first protocol in first frames and to transmit second uplink signals of the second protocol in second frames, wherein the first frames and the second frames are alternately set in a defined ratio, wherein
the reception circuitry is further configured to detect both the first downlink signal and the second downlink signal in the second frames.

17. The sensor controller according to claim 16, wherein the reception circuitry, in operation, detects both the first and second downlink signals in the first frames.

18. The sensor controller according to claim 16, wherein the sensor controller, in operation, changes the ratio according to a mixed state of the first downlink signal and the second downlink signal.

19. The sensor controller according to claim 18, wherein the sensor controller changes the ratio such that the greater the number of received second downlink signals with respect to the number of received first downlink signals, the higher a transmission rate of the second uplink signals.

20. The sensor controller according to claim 16, wherein the first and second uplink signals include a common part.

* * * * *